US007361827B2

(12) United States Patent
Sasaki

(10) Patent No.: US 7,361,827 B2

(45) Date of Patent: Apr. 22, 2008

(54) TRANSDUCER FREE FROM AGED DETERIORATION, MUSICAL INSTRUMENT USING THE SAME AND METHOD USED THEREIN

(75) Inventor: Tsutomu Sasaki, Hamamatsu (JP)

(73) Assignee: Yamaha Corporation, Hamamatsu-Shi (JP)

( * ) Notice: Subject to any disclaimer, the term of this patent is extended or adjusted under 35 U.S.C. 154(b) by 341 days.

(21) Appl. No.: 11/198,437

(22) Filed: Aug. 5, 2005

(65) Prior Publication Data

US 2006/0054010 A1 Mar. 16, 2006

(30) Foreign Application Priority Data

Sep. 15, 2004 (JP) ............................. 2004-268457

(51) Int. Cl.
*G01H 3/00* (2006.01)

(52) U.S. Cl. ............................ 84/723; 84/735; 84/737; 84/741

(58) Field of Classification Search ..................... None
See application file for complete search history.

(56) References Cited

U.S. PATENT DOCUMENTS 5,001,339 A 3/1991 Starkey
6,359,207 B1 3/2002 Oba
6,969,791 B2 * 11/2005 Fujiwara ........................ 84/13
6,992,241 B2 * 1/2006 Fujiwara ........................ 84/21
2005/0145087 A1 * 7/2005 Fujiwara .......................... 84/1
2005/0211048 A1 * 9/2005 Fujiwara ........................ 84/13

FOREIGN PATENT DOCUMENTS

EP 0 987 677 3/2000
JP 2000-131140 5/2002
WO WO-01/95308 12/2001

* cited by examiner

*Primary Examiner*—Marlon T Fletcher
(74) *Attorney, Agent, or Firm*—Morrison & Foerster LLP

(57) ABSTRACT

An electronic system, which serves as a recorder and an automatic player, is installed in an automatic player piano, and hammer sensors, which are implemented by photo couplers, report current hammer positions through analog signals to a data processor so that the data processor analyzes pieces of hammer data for recording the performance in a set of music codes; the analog signals are amplified through an operational amplifier and, thereafter, converted to discrete values of digital hammer signals so that an offset voltage is unavoidably introduced into the analog signals; when the photo couplers vary the light-to-photocurrent converting characteristics due to the aged deterioration, the data processor takes the offset voltage into account, and calibrates the hammer sensors, thereby making the digital hammer signals correctly express the current hammer positions.

21 Claims, 10 Drawing Sheets

| | PLOTS A | PLOTS B | PLOTS C |
|---|---|---|---|
| REST | 800 | 760 | 60 |
| END | 400 | 360 | 10 |

TBL1

| | | |
|---|---|---|
| 1 | AD' | TIME |
| 2 | AD' | TIME |
| 3 | AD' | TIME |
| ⋮ | ⋮ | ⋮ |
| 20 | AD' | TIME |

Fig. 8 A

TBL2

| | VELOCITY | ACCELERATION |
|---|---|---|
| AD'(−5),t(−5) | | |
| AD'(−4),t(−4) | v(−4) | a(−4) |
| AD'(−3),t(−3) | v(−3) | a(−3) |
| AD'(−2),t(−2) | v(−2) | a(−2) |
| AD'(−1),t(−1) | v(−1) | a(−1) |
| AD'(0),t(0) | v(0) | a(0) |
| AD'(1),t(1) | v(1) | a(1) |
| AD'(2),t(2) | v(2) | a(2) |
| AD'(3),t(3) | v(3) | a(3) |
| AD'(4),t(4) | v(4) | a(4) |
| AD'(5),t(5) | v(5) | |

Fig. 8 B

TRANSDUCER FREE FROM AGED DETERIORATION, MUSICAL INSTRUMENT USING THE SAME AND METHOD USED THEREIN

FIELD OF THE INVENTION

This invention relates to a transducer and, more particularly, to a transducer for producing a detecting signal representative of a physical quantity of a moving object, a musical instrument equipped with the transducer and a method employed therein.

DESCRIPTION OF THE RELATED ART

An automatic player piano is a typical example of the hybrid musical instrument. The automatic player piano is a combination of an acoustic piano and an electronic system, and a human pianist and an automatic player, which is implemented by the electronic system, perform pieces of music on the acoustic piano. While the human player is fingering on the keyboard, the depressed keys actuate the associated action units, which give rise to rotation of the hammers, and the strings are struck with the hammers at the end of the rotation. Then, the strings vibrate, and acoustic piano tones are produced through the vibrations of strings.

When a user instructs the automatic player to reenact the performance expressed by a set of music data codes, the automatic player starts to analyzes the music data codes, and sequentially give rise to the key motion and pedal motion without any fingering of the human player. While the black and white keys are traveling on respective reference trajectories, which the automatic player determines for the keys to be depressed on the basis of the music data codes, the key motion and/or hammer motion is monitored by key sensors and/or hammer sensors, and the automatic player forces the black and white keys to travel on the reference trajectories through the servo control loop.

The electronic system further serves as a recorder and/or electronic keyboard in several models of the automatic player piano. The recorder analyzes the key motion and/or hammer motion in an original performance on the acoustic piano, and produces music data codes representative of the original performance. The automatic player may reenact the performance expressed by the music data codes.

When a user instructs the electronic system to produce electronic tones instead of the acoustic piano tones, the music data codes, which are originated from the performance by the human pianist or loaded from an external data source, are supplied to the electronic tone generator, and an audio signal is produced from pieces of waveform data so as to be converted to the electronic tones. In case where the music data codes are originated from the performance on the acoustic piano, the key sensors, pedal sensors and/or hammer sensors reports the key motion, pedal motion and/or hammer motion to the controller, and the controller produces the music data codes through the analysis on these pieces of music data.

Thus, the key sensors, hammer sensors and pedal sensors are the important system components of the electronic system incorporated in the hybrid musical instrument.

Since the key motion and hammer motion are not simple, it is desirable that the key sensors and hammer sensors have monitoring ranges overlapped with the key trajectories and hammer trajectories. A typical example of the hammer sensor with the wide monitoring range is disclosed in Japanese Patent Application laid-open No. 2001-175262.

The prior art hammer sensor continuously monitors the hammer shank between the rest position and the rebound on the associated string. The prior art hammer sensor informs the controller of the current hammer position on the hammer trajectory, and makes it possible to calculate the hammer velocity and acceleration. The position, velocity and acceleration are different sorts of physical quantity, and any one of those sorts of physical quantity expresses the hammer motion.

The controller further analyzes the physical quantity so as to determine unique points on the hammer trajectory and another sort of physical quantity. The Japanese Patent Application laid-open teaches us that the controller determines the followings.

1. Time at which the hammer starts its motion, i.e., the starting time.
2. Time at which the hammer is brought into collision with the associated string, i.e., the impact time.
3. Hammer velocity immediately before the strike on the associated string, i.e., final hammer velocity.
4. Time at which the associated black or white key starts the key motion, i.e., the depressed time.
5. Time at which the back check receives the hammers after the rebound on the string, i.e., the back check time.
6. Time at which the hammer leaves the back check, i.e., the separating time.
7. Hammer velocity after the separation from the back check, i.e., the return velocity.
8. Time at which the damper returns onto the strings, i.e., the decay time.
9. Time at which the hammer is terminated at the end of the hammer trajectory, i.e., the end time.
10. Time at which the depressed key is released, i.e., the release time.

Thus, the controller acquires the various music data through the analysis on the pieces of hammer data expressing the hammer motion. In the analysis, the controller compares the current hammer position with thresholds to see where the hammer is passing, and determines a trajectory on which the hammer has traveled. The controller presumes the associated key motion, and categorizes the key motion in a certain style of rendition.

Although several sorts of transducers are disclosed in the Japanese Patent Application laid-open, an optical position transducer is described as the primary example of the structure. The optical position transducer is, by way of example, implemented by a combination of a light emitting element and a light detecting element, and the amount of light incident on the light detecting element is varied depending upon the position of the hammer shank on the trajectory. Since the controller presumes the current hammer position on the basis of the amount of light incident on the light detecting element, the relation between the amount of light and the hammer position is stable. For example, the light is constantly output from the light emitting element, and the incident light is to be converted to electric charge at a constant rate. However, the aged deterioration is unavoidable. Even though a constant potential difference is applied to the light emitting element, the amount of output light tends to be reduced in a long service time period so that the prior art optical transducer can not keep the incident light-to-hammer position characteristics stable for the long service time period. In this situation, it is impossible for the controller correctly to determine the hammer motion. This is the problem inherent in the prior art transducer.

A countermeasure is proposed in Japanese Patent Application laid-open No. 2000-155579. The prior art position transducer disclosed in the Japanese Patent Application laid-open is also categorized in the optical position transducer, and includes an light emitting element, a light detecting element and a data processing unit. The light emitting element is opposed to the light detecting element, and a light beam is produced across a trajectory of a shutter plate. The aged deterioration is also influential in the output signal of the prior art optical position transducer. In other words, the position-to-voltage characteristics are unavoidably varied in the long service time period.

In order to eliminate the influence due to the aged deterioration, the manufacturer memorizes the initial position-to-voltage characteristics in the read only memory incorporated in the data processing unit. After the delivery to the user, the data processing unit measures the maximum voltage, and compares the maximum voltage presently found on the position-to-voltage characteristics with the maximum voltage on the initial position-to-voltage characteristics to see whether or not the light emitting element and light detecting element vary the position-to-voltage characteristics. If the difference is found, the data processing unit calculates the ratio between the maximum voltage presently found on the position-to-voltage characteristics and the maximum voltage on the initial position-to-voltage characteristics, and memorizes the ratio.

While the prior art optical position transducer is converting the current position of the shutter plate to the output signal, the data processing unit presumes the current position of the shutter plate by multiplying the voltage level output from the light detecting element by the ratio. The product is indicative of the current position of the shutter plate on the initial position-to-voltage characteristics.

However, the prior art optical position transducer is still under the influence of the aged deterioration. Although the data processing unit periodically calibrates the light detecting element, the product tends not to indicate the current shutter position correctly. This is the problem inherent in the prior art optical position transducer.

SUMMARY OF THE INVENTION

It is therefore an important object of the present invention to provide a transducer, which exactly converts a physical quantity to an electric signal without any aged deterioration.

It is also an important object of the present invention to provide a musical instrument, which is equipped with the position transducer monitoring component parts thereof for producing tones.

It is another important object of the present invention to provide a method through which the transducer keeps itself free from the aged deterioration.

The present inventor contemplated the problem inherent in the prior art optical transducer, and noticed that the analog position signal had been converted to the digital position signal. In fact, the analog position signal was firstly amplified by means of an operational amplifier, and, thereafter, was converted to the digital position signal through the analog-to-digital converter. A differential amplifier was incorporated in the operational amplifier so that an offset voltage was unavoidable due to the differential amplifier. Although various circuit configurations had been proposed for the analog-to-digital converter, the analog circuit of the analog-to-digital converter introduced an offset voltage into the internal signal so that the digital position signal contained a noise component corresponding to the offset voltage.

Although the offset voltage was unavoidable in the analog circuits, the offset voltage was constant regardless of the potential level of the analog position signal. The present inventor concluded that the noise component due to the offset voltage was to be eliminated from the discrete value measured before the calibration.

In accordance with one aspect of the present invention, there is provided a transducer for converting a physical quantity of a moving object to a digital signal representative of the physical quantity comprising a gain controller varying a potential range of an analog signal representative of the physical quantity expressing motion of the moving object, a converter monitoring the moving object and causing the analog signal to swing a potential level in the potential range depending upon the physical quantity, an electric circuit connected to the converter, introducing an offset voltage into the analog signal and producing the digital signal on the basis of the analog signal, calibrator connected to the gain controller and the electric circuit and causing the gain controller to change the potential range between a first range and a second range so as to determine an offset value corresponding to the offset voltage on the basis of the digital signal produced in the first range and the digital signal produced in the second range, and adding the offset value to the digital signal so as to output a calibrated digital signal.

In accordance with another aspect of the present invention, there is provided a musical instrument comprising plural link works including certain links, respectively, and selectively moved for specifying the pitch of tones to be produced, a gain controller varying a potential range of analog signals representative of a physical quantity expressing motion of the certain links, plural converters respectively monitoring the certain links causing the analog signals to swing a potential level in the potential range depending upon the physical quantity, electric circuits respectively connected to the plural converters, introducing offset voltages into the analog signals, respectively, and respectively producing digital signals representative of the physical quantity on the basis of the analog signals, and a calibrator connected to the gain controller and the electric circuits, causing the gain controller to change the potential range between a first range and a second range so as to determine offset values corresponding to the offset voltages on the basis of the digital signals produced in the first range and the digital signals produced in the second range, and adding the offset values to the digital signals so as to output a calibrated digital signal.

In accordance with yet another aspect of the present invention, there is provided a method for determining an offset value corresponding to an offset voltage introduced in an analog signal comprising the steps of a) setting a first potential range in a physical quantity-to-signal converter, b) moving an object on a trajectory so that the physical quantity-to-signal converter produces the analog signal varied in the first potential range depending upon a physical quantity expressing the motion of the object, c) converting the analog signal varied in the first potential range to a digital signal, d) fetching discrete values at predetermined points on the trajectory of the object, e) setting a second potential range in the physical quantity-to-signal converter, f) moving the object on the trajectory so that the physical quantity-to-signal converter produces the analog signal varied in the second potential range depending upon the physical quantity, g) fetching other discrete values at the predetermined points, and h) calculating the offset value on the basis of the discrete values and the other discrete values.

BRIEF DESCRIPTION OF THE DRAWINGS

The features and advantages of the transducer, musical instrument and method will be more clearly understood from the following description taken in conjunction with the accompanying drawings, in which FIG. 8A is a view showing a table where pairs of calibrated discrete values and times at which the discrete values are fetched are accumulated, FIG. 8B is a view showing a table where velocity and acceleration are stored in terms of predetermined pairs of calibrated discrete values.

DESCRIPTION OF THE PREFERRED EMBODIMENTS

Figure 1:
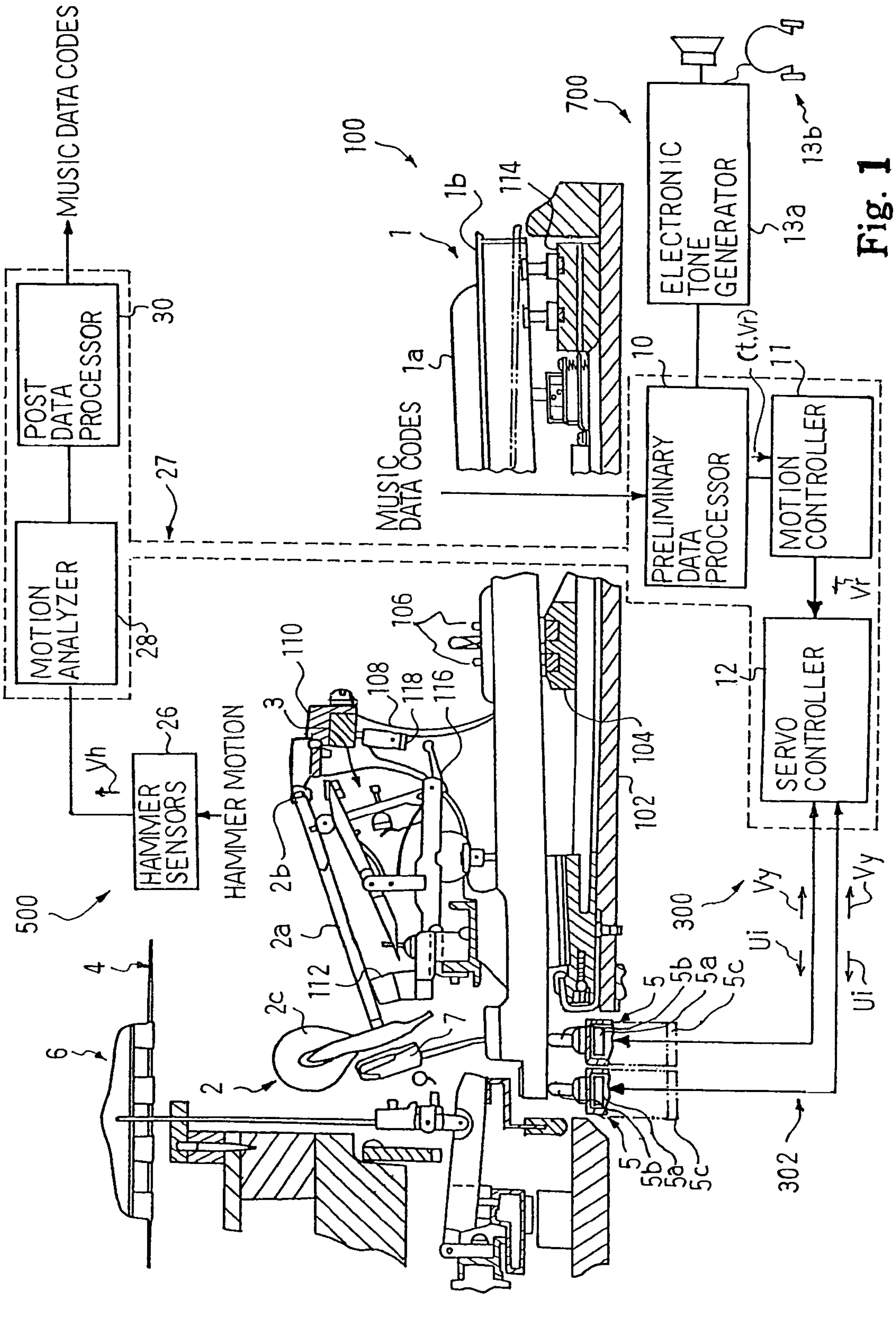
FIG. 1 is a side view showing the structure of an automatic player piano according to the present invention.

A musical instrument embodying the present invention largely comprises an acoustic piano and an electric system. The acoustic piano includes black and white keys, action units, hammers, dampers and strings. The black and white keys, action units and hammers form in combination plural link works, and the link works are selectively actuated by a human player or an automatic player, which the electric system serves as. When one of the link works is actuated, the force is transmitted from the black/white key through the action unit to the hammer, which serves as a "certain link", so that the hammer is moved toward the string. The hammer is brought into collision with the string at the end of the motion, and gives rise to vibrations of the string. Thus, a tone is produced through the vibrating string. Thus, the plural link works are selectively actuated for specifying the tones to be produced.

The electric system serves as the automatic player or a recorder, and includes a gain controller, plural converters, electric circuits, a calibrator and a data processing unit. The gain controller is connected to the plural converters, and is responsive to an instruction, which the calibrator gives thereto, so as to vary a potential range of analog signals output from the plural converters. The analog signals are representative of a physical quantity expressing motion of the certain links. The plural converters respectively monitor the certain links, and produce the analog signals representative of the physical quantity or motion of the certain links. In other words, the analog signals are representative of pieces of motion data of the certain links. Since the gain controller sets the limit to the potential range, the plural converters cause the analog signals to swing the potential level in the potential range depending upon the physical quantity.

The plural converters are connected through the electric circuits to the calibrator as well as the data processing unit. The electric circuits produces the digital signals from the analog signals so that the pieces of motion data are transmitted from the analog signals to the digital signals. However, an offset voltage is unavoidably introduced into the analog signals. This results in that a noise component is incorporated in the digital signals due to the offset voltage.

When the electric connection is changed to the calibrator, the calibrator causes the gain controller to change said potential range between a first range and a second range. The plural converters monitor the certain links, and produce the analog signals swung in the first range. The pieces of motion data are fetched by the calibrator, and are stored therein. The plural converters further produce the analog signals swung in the second range, and the calibrator fetches the pieces of motion data so as to store them therein. The calibrator analyzes the pieces of motion data produced in the first range and pieces of motion data produced in the second range, and determine offset values corresponding to the offset voltages through the analysis.

While a piece of music is being performed on the acoustic piano, the data processing unit receives the pieces of motion data, and determines the motion of certain links in consideration of the offset values. The data processing unit analyses the motion of certain links so as to produce pieces of music data representative of the tones to be produced. Thus, the data processing unit takes the offset values into account before the analysis. This results in that the pieces of music data exactly express the motion of certain links and the tones to be produced.

As will be appreciated from the above description, the calibrator eliminates the undesirable influence due to the offset value from the pieces of motion data, and permits the data processing unit exactly to produce the pieces of music data.

In the following description, term "front" is indicative of a position closer to a player, who is sitting on a stool for performing a piece of music, than a position modified with term "rear". A line drawn between a front position and a corresponding rear position extends in "fore-and-aft direction", and lateral direction crosses the fore-and-aft direction at right angle on a plane parallel to the horizontal plane.

First Embodiment

Referring to FIG. 1 of the drawings, an automatic player piano embodying the present invention largely comprises an acoustic piano 100 and an electric system, which serves as an automatic playing system 300, a recording system 500 and an electronic tone generating system 700. The automatic playing system 300, recording system 500 and electronic tone generating system 700 are installed in the acoustic piano 100, and are selectively activated depending upon user's instructions. While a player is fingering a piece of music on the acoustic piano 100 without any instruction for recording, playback and performance through electronic tones, the acoustic piano 100 behaves as similar to a standard acoustic piano, and generates the piano tones at the pitch specified through the fingering.

When the player wishes to record his or her performance on the acoustic piano 100, the player gives the instruction for the recording to the electric system, and the recording system 500 gets ready to record the performance. In other words, the recording system 500 is activated. While the player is fingering a music passage on the acoustic piano 100, the recording system 500 produces music data codes representative of the performance on the acoustic piano 100, and the set of music data codes are stored in a suitable memory forming a part of the electric system or remote from the automatic player piano. Thus, the performance is memorized as the set of music data codes.

A user is assumed to wish to reproduce the performance. The user instructs the electric system to reproduce the acoustic tones. Then, the automatic playing system 300 gets ready for the playback. The automatic playing system 300 fingers the piece of music on the acoustic piano 100, and reenacts the performance without any fingering of the human player.

A user may wish to hear electronic tones along a music passage. The user instructs the electronic tone generating system 700 to process the set of music data codes. Then, the electronic tone generating system 700 starts sequentially to process the music data codes so as to produce the electronic tones along the music passage.

The acoustic piano 100, automatic playing system 300, recording system 500 and electronic tone generating system 700 are hereinafter described in detail.

Acoustic Piano

In this instance, the acoustic piano 100 is a grand piano. The acoustic piano 100 includes a keyboard 1, hammers 2, action units 3, strings 4 and dampers 6. A key bed 102 forms a part of a piano cabinet, and the keyboard 1 is mounted on the key bed 102. The keyboard 1 is linked with the action units 3 and dampers 6, and a pianist selectively actuates the action units 3 and dampers 6 through the keyboard 1. The dampers 6, which have been selectively actuated through the keyboard 1, are spaced from the associated strings 4 so that the strings 4 get ready to vibrate. On the other hand, the action units 3, which have been selectively actuated through the keyboard 1, give rise to free rotation of the associated hammers 2, and the hammers 2 strike the associated strings 4 at the end of the free rotation. Then, the strings 4 vibrate, and the acoustic tones are produced through the vibrations of the strings 4. When the hammers 2 are brought into collision with the strings 4, the hammers 2 rebound on the strings 4, and are dropped therefrom.

The keyboard 1 includes plural black keys 1*a*, plural white keys 1*b* and a balance rail 104. The black keys 1*a* and white keys 1*b* are laid on the well-known pattern, and are movably supported on the balance rail 104 by means of balance key pins 106.

Action brackets 108 are laterally spaced from one another. A shank flange rail 110 laterally extends over the action brackets 108, and is secured thereto. The hammers 2 include respective hammer shanks 2*a*, and the hammer shanks 2*a* are rotatably connected to the shank flange rail 110 by means of pins 2*b*. The hammers 2 further include respective hammer heads 2*c*, which are respectively fixed to the leading ends of the hammer shanks 2*a*. Although back checks 7 upwardly project from the rear end potions of the black and white keys 1*a*/1*b*, the back checks 7 form parts of the action units 3, and the make the hammer heads 2*c* softly land thereon after the rebound on the strings 4. In other words, the back checks 7 prevent the hammers 2 from chattering on hammer shank stop felts 112.

While any force is not exerted on the black/white keys 1*a*/1*b*, the hammers 2 and action units 3 exert the force due to the self-weight on the rear portions of the black/white keys 1*a*/1*b*, and the front portions of the black/white keys 1*a*/1*b* are spaced from the front rail 114 as drawn by real lines. The key position indicated by the real lines is "rest position", and the keystroke is zero at the rest position.

When a pianist depresses the front portions of the black/white keys 1*a*/1*b*, the front portions are sunk against the self-weight of the action units/hammers 3/2. The front portions finally reach "end positions" indicated by dots-and-dash lines. The end positions are spaced from the rest positions along the key trajectories by a predetermined distance.

While the pianist is depressing the front portions of the black and white keys 1*a*/1*b*, the rear portions of the black and white keys 1*a*/1*b* are raised, and give rise to the rotation of the associated action units 2. A jack 116 is brought into contact with a regulating button 118, and escapes from the hammers 2*a*. The escape gives rise to the free rotation of the hammer 2 so that the hammer head 2*c* advances to the string 4. The depressed key 1*a*/1*b* further causes the dampers 6 to be spaced from the string 4 so that the string 4 gets ready for the vibrations as described hereinbefore. The hammer 2 is brought into collision with the string 4 at the end of the free rotation for producing the acoustic tones. The hammer 3 rebounds on the strings 4, and is received by the back check 7.

When the pianist releases the depressed black and white keys 1*a*/1*b*, the self-weight of the action unit/hammer 3/2 gives rise to the rotation of the black and white keys 1*a*/1*b*, and the action unit/hammer 3/2 return to the respective rest positions. The dampers 6 are brought into contact with the associated strings 4 on the way to the rest position so that the acoustic tones are decayed. In this instance, the hammers 2 travel on the hammer trajectories between the rest positions and the end of free rotation, and the end of free rotation is spaced from the rest position by 48 millimeters.

Electronic System

Description is hereinafter made on the electronic system, which serves as the automatic playing system 300, recording system 500 and electronic tone generating system 700 with concurrent reference to FIGS. 1 and 2.

The automatic playing system 300 includes an array of solenoid-operated key actuators 5, a manipulating panel (not shown), a data storage unit 23 (see FIG. 2) and a data processing unit 27. The recording system 500 includes hammer sensors 26, the manipulating panel (not shown), data storage unit 23 and data processing unit 27, and the electronic tone generating system 700 includes the data storage unit 23, data processing unit 27, an electronic tone generator 13*a* and a sound system 13*b*. Thus, the data processing unit 27 and manipulating panel (not shown) are shared among the automatic playing system 300, the recording system 500 and electronic tone generating system 700.

The key bed 102 is formed with a slot under the rear portion of the black and white keys 1*a*/1*b*, and the array of the solenoid-operated key actuators 5 is supported by the key bed 102 in such a manner as to project through the slot. The solenoid-operated key actuators 5 are laterally arranged in a staggered fashion, and are associated with the black and white keys 1*a*/1*b*, respectively. A solenoid 5*a*, a plunger 5*b*, return sprint (not shown) and a built-in plunger sensor 5*c* are assembled into each solenoid-operated key actuator 5 together with a yoke, which is shared with the other solenoid-operated key actuators 5. While the solenoid 5*a* is standing idle without any current, the tip of the plunger 5*b* is in the proximity of the lower surface of the rear portion of the associated black or white key 1*a*/1*b*. When the solenoid 5*a* is energized with a driving signal Ui, magnetic field is created, and the force is exerted on the plunger 5*b*. Then, the plunger 5*b* upwardly projects from the solenoid 5*a*, and upwardly pushes the rear portion of the black or white key 1*a*/1*b*. The plunger sensor 5*c* monitors the plunger 5*b*, and produces a plunger position signal Vy representative of the current plunger position. The solenoid 5*a*, built-in plunger sensor 5*c* and a servo controller 12 form in combination a servo control loop 302, and the plunger motion and, accordingly, key motion is controlled through the servo control loop 302.

The hammer sensors 26 are respective associated with the hammers 2, and are categorized in an optical position transducer. The hammer sensors 26 have a monitoring range overlapped with the hammer trajectories so as to convert the current physical quantity such as current hammer position into hammer position signals Vh.

Each of the hammer sensors 26 includes a light radiating sensor head, a light receiving sensor head, a light emitting element, a light detecting element and optical fibers connected between the light emitting element/light detecting elements and the light radiating sensor head/light receiving sensor head. The light radiating sensor heads form light radiating sensor head groups, and the light receiving sensor heads also form light receiving sensor head groups. The light radiating sensor head groups are respectively associated with the light emitting elements, and the light receiving sensor head groups are respectively associated with the light detecting elements. In detail, each of the light radiating sensor head groups is coupled to one of the light emitting elements through a bundle of optical fibers, and the light receiving sensor heads, each of which is selected from one of the light receiving sensor head groups, are respectively coupled to the light detecting elements through the optical fibers, each of which is also selected from a bundle of optical fibers.

A time frame is divided into plural time slots, and the plural time slots are respectively assigned to the light emitting elements. The time frame is repeated so that each time slot takes place at regular intervals. Thus, the light emitting elements are sequentially energized in the time slots assigned thereto, and the light is supplied from the light emitting element just energized to the associated bundle of optical fibers.

The light is concurrently supplied from each light emitting element to the light radiating sensor heads of the associated group through the bundle of optical fibers, and is radiated from the light radiating sensor heads to the light receiving sensor heads across the hammer trajectories of the associated hammers 2. The light, which is concurrently output from the light radiating sensor heads, is incident on the light receiving sensor heads, each of which is selected from one of the light receiving sensor head groups, and is transferred through the optical fibers, each of which is selected from the bundles, to the light detecting elements. The light detecting elements convert the incident light to photo current, the amount of which is proportional to the amount of incident light.

In this instance, twelve light emitting elements and eight light detecting elements are provided for the eighty-eight black and white keys 1*a*/1*b*. The control sequence for the hammer sensors 26 is, by way of example, disclosed in Japanese Patent Application laid-open No. Hei 9-54584.

The amount of incident light is varied together with the current hammer position on the hammer trajectory for the associated hammer 2. For this reason, the amount of photo current is also varied together with the current hammer position, and the photo current flows out from each light detecting element as the hammer position signal Vh.

Figure 2:
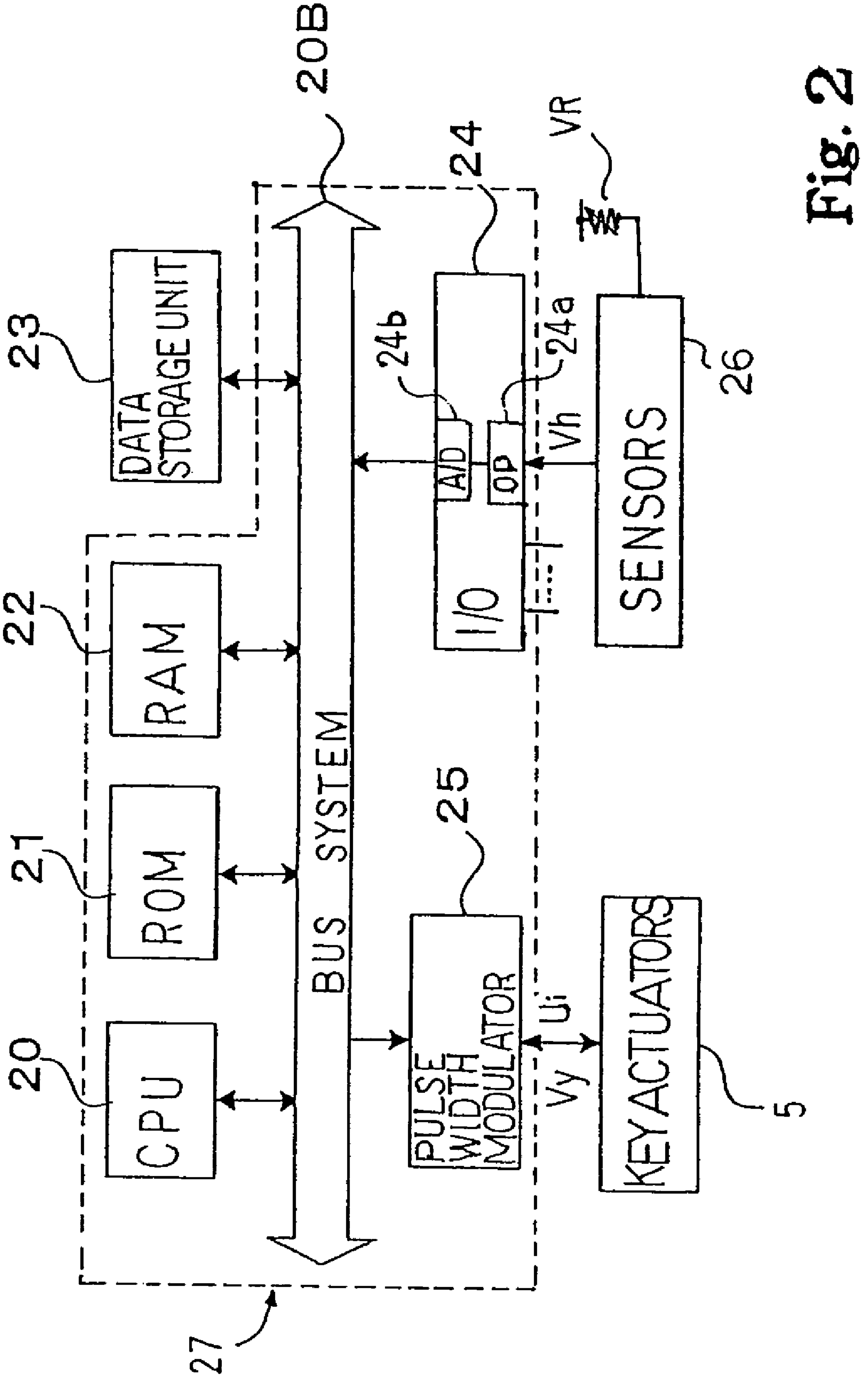
FIG. 2 is a block diagram showing the system configuration of a data processing unit incorporated in the automatic player piano.

The amount of light, which is emitted from each light emitting element, is varied together with the potential difference applied thereto, and each light emitting element is connected to a voltage converter VR (see FIG. 2). The data processing unit 27 supplies a control signal to each voltage converter VR so that the potential difference and, accordingly, the amount of light is varied depending upon the binary number of the control signals.

In this instance, the voltage controller VR includes a constant current source and a variable resistor. The constant current source is connected to a power supply line, and supplies the current through the variable resistor to the light emitting element. The variable resistor is responsive to the control signal so as to vary the resistance against the constant current. As a result, the potential difference applied to the light emitting element is varied inversely proportional to the resistance. The variable resistor may be implemented by a combination of a resistor string and a selector. Thus, the data processing unit 27 can adjust the amount of light and, accordingly, a gain of the hammer sensor to any arbitrary value by using the control signal.

The data processing unit 27 includes a central processing unit 20, which is abbreviated as "CPU", a read only memory 21, which is abbreviated as "ROM", a random access memory 22, which is abbreviated as "RAM", a bus system 20B, an interface 24, which is abbreviated as "I/O" and a pulse width modulator 25. These system components 20, 21, 22, 24 and 25 are connected to the bus system 20B, and the data storage unit 23 is further connected to the bus system 20B. Address codes, instruction codes, control data codes and music data codes are selectively propagated from particular system components to other system components through the bus system 20B. Though not shown in FIG. 2, a clock generator and a frequency divider are further incorporated in the data processing unit 27, and a system clock signal and a tempo clock signal make the system components synchronized with one another and various timer interruptions take place.

The central processing unit 20 is the origin of the data processing capability. The instruction codes, which are representative of a main routine program and subroutine programs, and data/parameter tables are stored in the read only memory 21, and the computer programs run on the central processing unit 20 so as to accomplish jobs selectively assigned to a preliminary data processor 10, a motion controller 11, a servo controller 12, a motion analyzer 28 and a post data processor 30. The random access memory 22 offers a temporary data storage, and serves as a working memory. The working memory is hereinafter labeled with the same reference numeral "22".

The data storage unit 23 offers a large amount of data holding capacity to the automatic playing system 300, recording systems 500 and electronic tone generating system 700. The music data codes are stored in the data storage unit 23 for the playback. In this instance, the data storage unit 23 is implemented by a hard disk driver. A flexible disk driver or floppy disk (trademark) driver, a compact disk driver such as, for example, a CD-ROM driver, a magnetic-optical disk driver, a ZIP disk driver, a DVD (Digital Versatile Disk) driver and a semiconductor memory board are available for the systems 300/500/700.

The hammer sensors 26 and manipulating panel (not shown) are connected to the interface 24, and the pulse width modulator 25 distributes the driving signal Ui to the solenoid-operated key actuators 5. The interface 24 contains plural operational amplifiers 24*a* and plural analog-to-digital converters 24*b*. Although sample-and-hold circuits are respectively connected to the plural analog-to-digital converters 24*b*, the sample-and-hold circuits are not shown in the drawings for the sake of simplicity. The light detecting elements are selectively connected to the operational amplifiers 24*a*, and the hammer position signals Vh are amplified through the operational amplifiers 24*a*. The operational amplifiers 24*a* are respectively connected through the sample-and-hold circuits (not shown) to the analog-to-digital converters 24*b* so that the discrete values on the analog hammer position signals are periodically converted to binary codes, which form digital hammer position signals. The system clock signal periodically gives rise to a timer interruption for the central processing unit 20 so that the central processing unit 20 periodically fetches the pieces of hammer data representative of the current hammer positions from the interface 24. The pieces of hammer data are transferred through the bus system 20B to the random access memory 22, and are temporarily stored therein. In this instance, the binary values of the digital hammer position signals are fallen within the range from zero to 1023

The pulse width modulator 25 is responsive to a control signal representative of a target mount of mean current or a target value of duty ratio so as to adjust the driving signals Ui to the target mean current or target duty ratio. The driving signals Ui are selectively distributed to the solenoid-operated key actuators 5. The magnetic field is created in the presence of the driving signal Ui so that it is possible to control the force exerted on the plungers 5*b* and, accordingly, on the black/white keys 1*a*/1*b* with the control signals.

The data processing unit 27 may further include a communication interface, to which music data codes are supplied from a remote data source through a public communication network. However, these system components merely indirectly concern the gist of the present invention, and no further description is incorporated for the sake of simplicity.

The function of the data processing unit 27, which forms a part of the automatic playing system 300, is broken down into the preliminary data processor 10, motion controller 11 and servo controller 12. In other words, the preliminary data processor 10, motion controller 11 and servo controller 12 are implemented by the subroutine programs running on the central processing unit 20.

A set of music data codes representative of a performance to be reenacted is loaded to the preliminary data processor 10. The set of music data was, by way of example, memorized in the data storage unit 23. Otherwise, the set of music data codes is supplied from an external data source through a public communication network and the communication interface (not shown) to the working memory 22.

The preliminary data processor 10 sequentially analyzes the music data codes, and determines the piano tones to be reproduced and timing at which the piano tones are reproduced and decayed. The piano tones to be produced are expressed by the key numbers Kni where i ranges from 1 to 88. The preliminary data processor 10 determines a reference key trajectory for the black/white keys 1*a*/1*b*, and further determines a series of values of target key velocity (t, Vr) on the reference key velocity. The target key velocity Vr is varied together with time t, and the target key velocity Vr expresses target key motion at time t together with another physical quantity such as, for example, the target key position. In case where the solenoid-operated key actuators 5 are expected to give rise to uniform motion, the target key velocity Vr is constant. The servo control loop 302 makes the plunger 5*b* and, accordingly, black 1*a*/1*b* catch up the target plunger velocity and target key velocity Vr.

There is a unique point on the reference key trajectory, and the unique point is called as a "reference point". If the black/white key 1*a*/1*b* passes the reference point at a target key velocity Vr, the black/white key 1*a*/1*b* gives rise to the hammer motion, which results in the strike on the string 4 at a target value of the final hammer velocity. Since the final hammer velocity is proportional to the loudness of the acoustic piano tone, the black/white key 1*a*/1*b*, which passes the reference key point at the target key velocity Vr, makes the string 4 to produce the acoustic tone at the target loudness expressed by the music data code.

The preliminary data processor 10 supplies a control data signal representative of the target key velocity (t, Vr) to the motion controller 11. The motion controller 11 checks the internal clock for the lapse of time. When the time t comes, the motion controller 11 supplies a control data signal representative of the current value of the target key velocity Vr to the servo controller 12. Thus, the motion controller 11 periodically informs the servo controller 12 of the series of values of target key velocity Vr.

The built-in plunger sensor 5*c* supplies the plunger position signal Vy representative of the current key position to the servo controller 12. The servo-controller 12 determines a current key velocity on the basis of a predetermined number of values of current key position. The current key velocity and current key position expresses current key motion. The servo-controller 12 compares the current key motion with the target key motion to see whether or not the black/white key 1*a*/1*b* surely travels on the reference key trajectory. If the difference takes place, the servo-controller 12 varies the mean current or duty ratio of the driving signal Ui, and supplies the driving signal Ui to the solenoid 5*a*. However, when the servo controller 12 does not find any difference between the current key motion and the target key motion, the servo controller 12 keeps the mean current or duty ratio at the previous value. Thus, the servo control loop 302 forces the black and white keys 1*a*/1*b* to pass the reference points at the target key velocity. This results in the tones at the target loudness.

The function of the data processing unit 27, which forms a part of the recording system 500, is broken down into the motion analyzer 28 and post data processor 30. The motion analyzer 28 and post data processor 30 are also implemented by another subroutine program running on the central processing unit 20.

The hammer sensors 26 supply the analog hammer position signals Vh, which represent current hammer positions of the associated hammers 2, to the motion analyzer 28, and the motion analyzer 28 periodically fetches the discrete values AD represented by the digital hammer position signals. The motion analyzer 28 determines pieces of hammer data such as the final hammer velocity and impact time and so forth which are required for pieces of music data codes in the formats defined in the MIDI (Musical Instrument Digital Interface) protocols.

The post data processor 30 presumes pieces of key data such as the key number Kni, and determines the pieces of music data on the basis of the pieces of hammer data, normalizes the pieces of music data, and produces the music data codes defined in the MIDI protocols. Duration data codes, each of which expresses the lapse of time between the continuous events, are inserted into the series of event data codes. The downward key motion for producing the piano tones is called as a "note-on event", and the note-on event is expressed by a note-on music data code. On the other hand, the upward key motion for decaying the piano tones is called as a "note-off event", and the note-off event is expressed by a note-off music data code. A set of music data codes, which expresses the performance on the acoustic piano 100, is supplied to the data storage unit 23, and is stored therein. Otherwise, the music data codes are supplied from the communication interface (not shown) through the public network to an external data storage or another musical instrument in a real time fashion.

As will be hereinlater described, the motion analyzer 28 and post data processor 30 determines offset values on the basis of the discrete values AD of the digital hammer position signals.

The electronic tone generating system 700 includes the preliminary data processor 10, an electronic tone generator 13*a* and a sound system 13*b*. The preliminary data processor 10 measures the lapse of time. When the time, at which the tone is to be produced or to be decayed, comes, the preliminary data processor 10 supplies the note-on data codes or note-off data codes to the electronic tone generator 13*a*. Pieces of waveform data are read out from a waveform memory, which forms a part of the electronic tone generator 13*a*, and form a digital audio signal representative of the electronic tones to be produced. The digital audio signal is supplied from the electronic tone generator 13*a* to the sound system 13*b*. The digital audio signal is converted to an analog audio signal, and the analog audio signal is equalized and amplified in the sound system 13*b*. Thereafter, the analog audio signal is converted to the electronic tones through loud speakers and/or a headphone.

The behavior of the automatic player piano is briefly described. Assuming now that a pianist instructs the recording system 500 to record his or her performance through the manipulating panel (not shown), the recording system 500 gets ready to record the performance on the acoustic piano 100. While the pianist is fingering on the keyboard 1, the hammer sensors 26 continuously report the current hammer positions of the associated hammers 2 to the interface 24 through the analog hammer position signals Vh. The analog hammer position signals Vh are amplified and sampled for the analog-to-digital conversion. The discrete values AD of the digital hammer position signals are varied between zero and 1023, and are transferred to the motion analyzer 28. A series of discrete values AD is accumulated in the working memory 22 for each of the black and white keys 1*a*/1*b*, and expresses a locus of the associated hammer 2. The motion analyzer 28 analyzes the series of discrete values AD or the locus of associated hammer 2 so as to extract the pieces of hammer data. The pieces of hammer data are supplied to the post data processor 30, and the post data processor 30 determines the pieces of music data to be required for producing the music data codes. Thus, the motion analyzer 28 cooperates with the post data processor 30, and accumulates the music data codes in the working memory 22. Upon completion of the performance, the post data processor 30 memorizes the set of music data codes expressing the performance in a suitable data file such as, for example, a standard MIDI file, and transfers the data file to the data storage unit 23 or an external destination through the public communication network.

A user is assumed to request the automatic playing system 300 to reenact the performance through the manipulating panel (not shown). The set of music data codes is loaded to the working memory 22, and the automatic playing system 300 gets ready for the performance.

The preliminary data processor 10 starts to measure the lapse of time, and compares the lapse of time with the time period expressed in the duration data code. When the preliminary data processor 10 decides that the depressed time has come, the preliminary data processor 10 determines the reference trajectory for a black/white key 1*a*/1*b* to be depressed and the series of values of target key velocity (t, Vr). The series of values of target key velocity (t, Vr) is transferred to the motion controller 11, and each value of target key velocity Vr is periodically supplied from the motion controller 11 to the servo controller 12. The servo controller 12 determines the current key motion on the basis of the plunger position signal Vy, and decides the means current or duty ratio on the basis of the difference between the current key motion and the target key motion. The driving signal Ui is adjusted to the target value of the mean current or target value of duty ratio, and is supplied from the servo controller 12 to the solenoid 5*a* of the solenoid-operated key actuator 5 associated with the black/white key 1*a*/1*b* to be depressed. Thus, the mean current or duty ratio is periodically regulated to the target value so as to force the plunger 5*b* and associated black/white key 1*a*/1*b* to travel on the reference key trajectory. The black/white key 1*a*/1*b* actuates the associated key action unit 3, and makes the jack 116 escape from the associated hammer 2. The hammer 2 starts the free rotation at the escape, and is brought into collision with the associated string 4 at the end of the free rotation. The hammer 2 rebounds on the string 4, and is dropped onto the hammer shank stop felt 112. The back check 7 brakes the hammer 2, and makes the hammer 2 softly landed on the hammer shank stop felt 112.

When the preliminary data processor 10 finds the note-off event code for the back/white key 1*a*/1*b*, the preliminary data processor 10 determines a key trajectory toward the rest position, i.e., a reference backward key trajectory and a series of values of target released key velocity. The preliminary data processor 10 informs the motion controller 11 of the target released key velocity. The motion controller 1 periodically informs the servo controller 12 of the value of target key velocity, and requests the servo controller 12 to force the black/white key 1*a*/1*b* to travel on the reference backward key trajectory. While the plunger 5*b* is being retracted into the solenoid Sa, the servo controller 12 compares the current key motion with the target key motion to see whether or not the black/white key 1*a*/1*b* surely travels on the reference backward key trajectory, and the action unit 3 and hammer 2 return toward the rest positions. The damper 6 is brought into contact with the vibrating string 4 at the decay time, and the acoustic piano tone is decayed.

While the automatic playing system 300 is reenacting the performance, the above-described control sequence is repeated for the black and white keys 1*a*/1*b* which were depressed and released in the original performance, and the acoustic piano tones are produced along the music passage.

The user is assumed to produce the electronic tones along a music passage. The set of music data codes is also loaded to the working memory 22, and preliminary data processor 10 starts to measure the lapse of time. The preliminary data processor 10 periodically checks the internal clock to see whether or not the time to produce the electronic tone comes. While the answer is negative, the preliminary data processor 10 repeats the check. With the positive answer, the preliminary data processor 10 transfers the note-on event code to the electronic tone generator 13*a*, and makes the sound system 13*b* radiate the electronic tone. The preliminary data processor 10 repeats the above-described jobs until the end of the music passage so that the electronic tones are sequentially produced along the music passage.

Method for Determining Offset Voltage

Figures 3, 4:
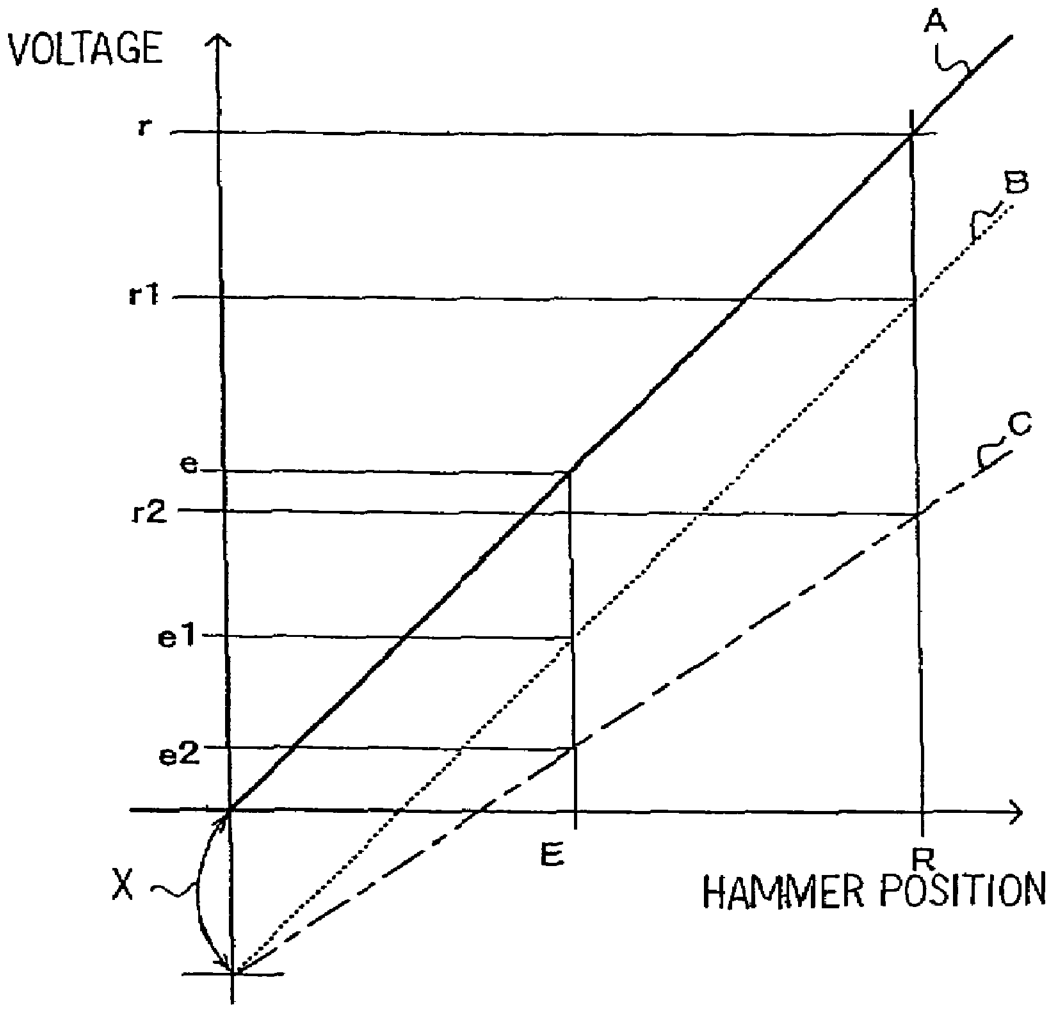
FIG. 3 is a graph showing the ideal position-to-voltage characteristics and actual position-to-voltage characteristics.
FIG. 4 is a view showing the discrete values at the rest and end positions found on the ideal position-to-voltage characteristics and actual position-to-voltage characteristics.

The noise component is determined as follows. FIG. 3 shows a result of an experiment. For the experiment, the present inventor prepared the optical transducer 26, which included the light emitting element and light detecting element, operational amplifier 24*a* and analog-to-digital converter 24*b*. The voltage converter VR was connected between the power supply line and the light emitting element.

The light extended across a trajectory of the hammer 2, and was incident onto the light detecting element. The incident light was converted to photo current, and the photo current was output from the output node of the light detecting element to the operational amplifier 24*a* as the analog hammer position signal Vh. The analog hammer position signal was amplified through the operational amplifier 24*a*, and was, thereafter, supplied to the analog-to-digital converter 24*b*. In this instance, the analog-to-digital converter 24*b* was of the type having an operational amplifier so that the noise component was further introduced into the output signal of the operational amplifier 24*a* due to the offset voltage. The analog hammer position signal was sampled, and the discrete values of the voltage on the analog hammer position signal were converted to the binary numbers AD through the analog-to-digital converter 24*b*.

The present inventor firstly instructed the data processing unit 27 to adjust the control signal to a large value so that the light emitting element emitted strong light. While the hammer 2 was gradually intersecting the light, the amount of incident light was reduced, and, accordingly, the binary number was changed. The present inventor measured the voltage at the output node of the light detecting element, and instructed the data processing unit 27 to fetch the discrete value AD at the output node of the analog-to-digital converter 24*b*, and plotted the voltage level in terms of the current position of the hammer 2 as shown in FIG. 3.

The present inventor instructed the data processing unit 27 to reduce the binary number of the control signal so that the light emitting element emitted weak light. While the hammer 2 was gradually intersecting the light, the present inventor also instructed the data processing unit 27 to fetch the discrete value AD at the output node of the analog-to-digital converter 24*a*, and plotted the voltage level also in FIG. 3.

In FIG. 3, the abscissa and axis of ordinate are indicative of the measured voltage and hammer position, and "R" and "E" stand for the rest position and the end position, respectively. Plots A are indicative of the potential level at the output node of the light detecting element in the presence of the strong light, and plots B are indicative of the discrete value AD at the output node of the analog-to-digital converter 24*b* also in the presence of the strong light. Plots C are indicative of the discrete value AD at the output node of the analog-to-digital converter 24*b* in the presence of the weak light.

Comparing the plots A with plots B, the present inventor confirmed that offset voltage x had been introduced by the operational amplifier 24*a* and analog-to-digital converter 24*b* and that the potential difference due to the offset voltage x was constant regardless of the hammer position. On the other hand, the potential difference between plots B and plots C was decreased together with the hammer position from the rest position R to the end position E, and was considered to be due to the reduction in the amount of emitted light. For example, the potential difference due to the offset voltage x was equivalent to binary number of 40 at both rest and end position as shown in FIG. 4. However, the potential difference due to the reduction in the emitted light, i.e., the difference between plots B and plots C was equivalent to the binary value of 700 at the rest position R and 350 at the end position E. Thus, the potential difference due to the aged deterioration was decreased along the trajectory of the hammer 2.

From the result of experiment, it is understood that the prior art method disclosed in Japanese Patent Application laid-open No. 2000-155579 is available for the calibration after the elimination of the noise component due to the offset voltage x from the discrete value ADs.

The offset value x is expressed as $$x=(r2\times e1-r1\times e2)/(r1-r2+e2-e1) \qquad \text{Equation 1}$$

where r1 is the measured value on plots B at the rest position R, e1 is the measured value on plots B at the end position E, r2 is the measured value on plots C at the rest position R and e2 is the measured value on plots C at the end position E.

The measured values in the table shown in FIG. 4 are substituted for r2, e2, r1 and e1. Then, the calculation results in the offset value x of 40.

The manufacturer carries out the experiments, and determines the offset value x for each product of automatic player piano in the assembling work. The offset value x is stored in the read only memory 21, which is implemented by a electrically erasable and programmable read only memory, before the delivery to a user, and is read out from the read only memory 21 in the recording.

Figure 5:
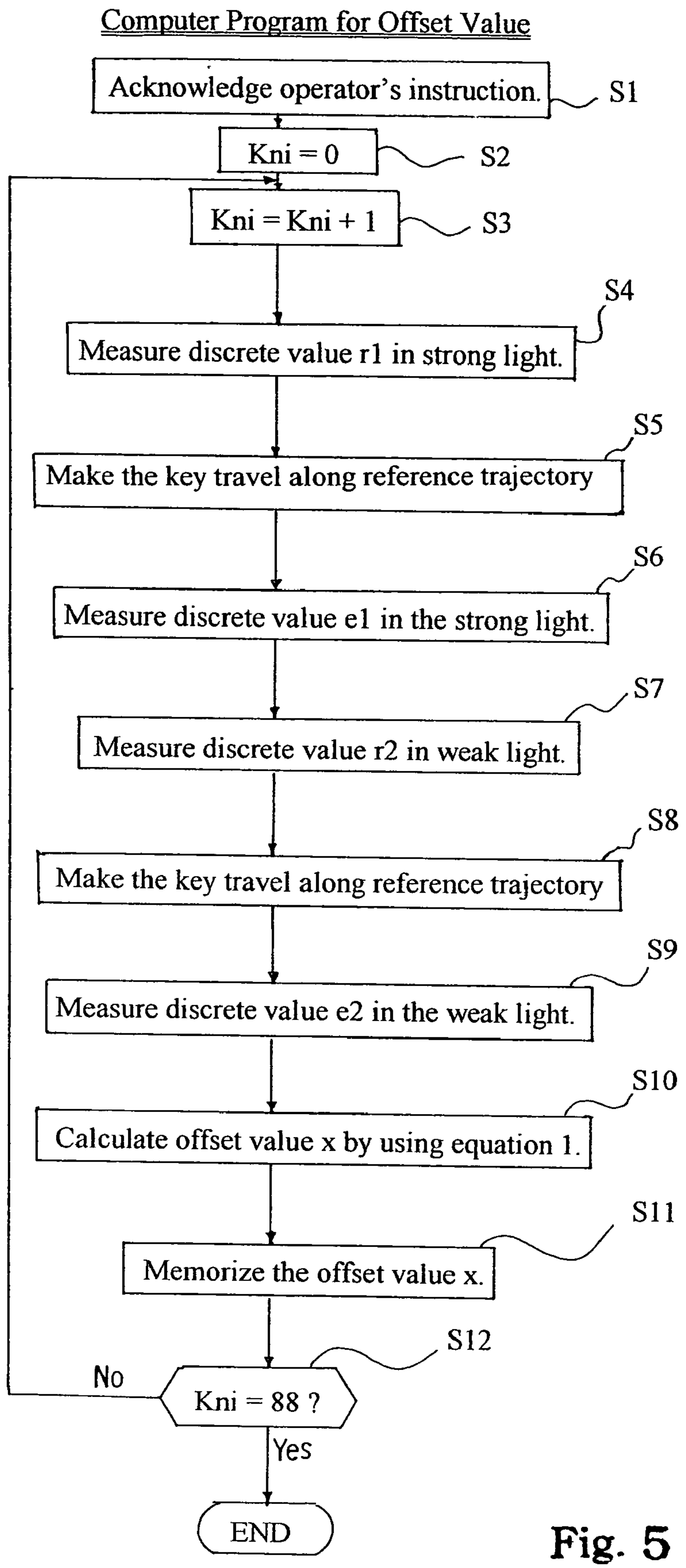
FIG. 5 is a flowchart showing a sequence of jobs executed for determining an offset value.

FIG. 5 shows a sequence of jobs incorporated in a subroutine program for determining the offset value x. In this instance, the computer program installed in the electronic system, and starts to run on the central processing unit 20 upon completion of the assembling work. Of course, when an operator repairs the automatic player piano at user's home, he or she may recalculate the offset value x. In the following description, the discrete values AD at the rest positions are fetched from the analog-to-digital converters 24*b* under the condition that the hammers 2 stay at the rest positions, i.e., the hammers 2 are unmoved. On the other hand, the discrete values AD at the end positions are fetched from the analog-to-digital converters 24*b* at the strike on the strings 4 with the hammers 2.

The electric system is assumed to be initialized. When the operator instructs the central processing unit 20 to calculate the offset value x through the manipulating panel (not shown), the central processing unit 20 acknowledges the operator's instruction as by step S1, and the main routine program branches to the subroutine program.

Upon entry into the subroutine program, the central processing unit 20 sets the key number Kni to zero as by step S2, and, thereafter, the central processing unit 20 increments the key number Kni by one as by step S3. The key number "1" is indicative of the leftmost white key 1*b* in the keyboard 1.

Subsequently, the central processing unit 20 supplies the control signal indicative of "strong light" from the interface (not shown) to the voltage converter VR, and the voltage converter VR starts to supply a large amount of current to the light emitting element, which supplies the strong light to the light radiating head for the leftmost white key 1*b*. The strong light is radiated from the light radiating sensor head to the light receiving sensor head, and the incident light is converted to the photo current or the analog hammer position signal Vh. The analog hammer position signal Vh is amplified through the operational amplifier 24*a,* and is converted to the binary value or the discrete value AD. The central processing unit 20 fetches the discrete value AD from the output node of the analog-to-digital converter 24*b,* and memorizes the discrete value AD in the working memory 22 as by step S4. The discrete value AD is corresponding to "r1" on plots B.

Subsequently, the central processing unit 20 determines a reference key trajectory on the basis of pieces of test data, and makes the motion controller 11 control the leftmost white key 1*b* through the servo controller 12 as by step S5. The reference trajectory expresses ordinary key motion so that the leftmost white key 1*b* travels on the reference trajectory toward the end position E at a moderate speed.

When the leftmost white key 1*b* reaches the end position E, the central processing unit 20 fetches the discrete value e1 from the output node of the analog-to-digital converter 24*b,* and memorizes the discrete value AD, which is corresponding to the discrete value e1 in the working memory 22 as by step S6. When the discrete value AD is minimized, the central processing unit 20 acknowledges the arrival at the end position E. Otherwise, when the plunger position signal Vy has a constant value, the central processing unit 20 acknowledges the arrival at the end position E. Upon completion of the measurement in the presence of the strong light, the central processing unit 20 supplies a reference backward trajectory to the motion controller 11 so that the leftmost white key 1*b* returns to the rest position R.

Subsequently, the central processing unit 20 supplies the control signal representative of "weak light" to the voltage converter VR so that the light emitting element supplies the weak light to the light radiating sensor head. The light is incident on the light receiving sensor head, and the incident light is converted to the analog hammer position signal through the light detecting element. The analog hammer position signal is amplified through the operational amplifier 24*a,* and, thereafter, is converted to the discrete value r2 through the analog-to-digital converter 24*b*.

The central processing unit 20 fetches the discrete value AD, which is corresponding to the discrete value r2, from the output node of the analog-to-digital converter 24*b,* and memorizes the discrete value r2 in the working memory 22 as by step S7.

Upon memorization of the discrete value r2, the central processing unit 20 supplies the reference key trajectory to the motion controller 11, and makes the servo controller 12 force the leftmost white key 1*b* to travel on the reference key trajectory as by step S8.

When the leftmost white key 1*b* reaches the end position E, the central processing unit 20 fetches the discrete value e2 from the output node of the analog-to-digital converter 24*b,* and memorizes the discrete value e2 in the working memory 22 as bys step S9. The central processing unit 20 supplies the reference backward key trajectory to the motion controller 11, and causes the leftmost white key 1*b* to return to the rest position R.

Subsequently, the central processing unit 20 reads out the discrete values r1, e1, r2 and e2 from the working memory 22, and calculates the noise component due to the offset value x by using equation 1 as by step S10. The central processing unit 20 memorizes the offset value x in the electrically erasable and programmable memory 21 as by step S11.

Upon completion of the job at step S10, the central processing unit 20 compares the key number Kni with the maximum key number "88" to see whether or not the offset value x is determined for all the black and white keys 1*a*/1*b* as by step S12. When the answer at step S12 is given negative "No", the central processing unit 20 returns to step S3, and increments the key number Kni by 1. While the answer at step S12 is being given negative, the central processing unit 20 repeats the loop consisting of steps S3 to S12, and accumulates the offset value x for the black and white keys 1*a*/1*b*.

When the offset value x is memorized in the working memory for the rightmost white key 1*b,* the answer at step S12 is changed to affirmative "Yes", and the central processing unit 20 terminates the subroutine program, i.e., returns to the main routine program.

If the discrete value r2, e2, r1 and e1 are equal to those in the table shown in FIG. 4, the offset value x is "40", and the discrete values r1 and e1 are estimated at 800 and 400. The ratio between the discrete value r1 and the discrete value e1 is 2:1. The ratio of any hammer position to the rest position R is hereinafter referred to as "position ratio". The rest position R has the position ratio of 50%. When the offset value x is added to the discrete values r2 and e2, the calibrated discrete values are equal to 100 and 50, and the radio between the calibrated discrete values is also 2:1. In this situation, it is possible to move the discrete values AD on any position-to-voltage characteristics at any amount of light onto plots A. If plots C are indicative of present position-to-voltage characteristics, the offset value of "40" is added to the discrete values on plots C, and the calibrated discrete values are to be multiplied by eight. Thus, it is possible to estimate the discrete value AD on plots A.

The manufacturer stores reference position-to-voltage characteristics and offset value x in the read only memory 21 before delivery to the user. The central processing unit 20 periodically carries out the experiments on the eighty-eight black and white keys 1*a*/1*b* so as to determine the calibration ratio, and stores the calibration ratio in the read only memory 21. While the user is recording his or her performance, the central processing unit 20 calibrates the discrete value AD, and estimates the discrete value AD on the reference position-to-voltage characteristics on the basis of the calibrated discrete values, and exactly determines the current hammer position.

Calibration in System Initialization

When a user turns on the power switch on the manipulating panel (not shown), the central processing unit 20 starts to initialize the electronic system, and carries out the calibration of the hammer sensors 26 in the system initialization as follows. As described hereinbefore, the hammer stroke is 48 millimeter long. In other words, when the hammer stroke 2 is zero at the rest position, the hammers at the end position are spaced from those at the rest positions by 48 millimeters. Two more reference points are determined on each of the hammer trajectories. The first reference point is spaced from the end position by 8 millimeters, and is labeled with "M1". The second reference point M2 is spaced from the end position by 0.5 millimeter. Thus, the first and second reference points M1 and M2 are relative position with respect to the end position.

Figure 6:
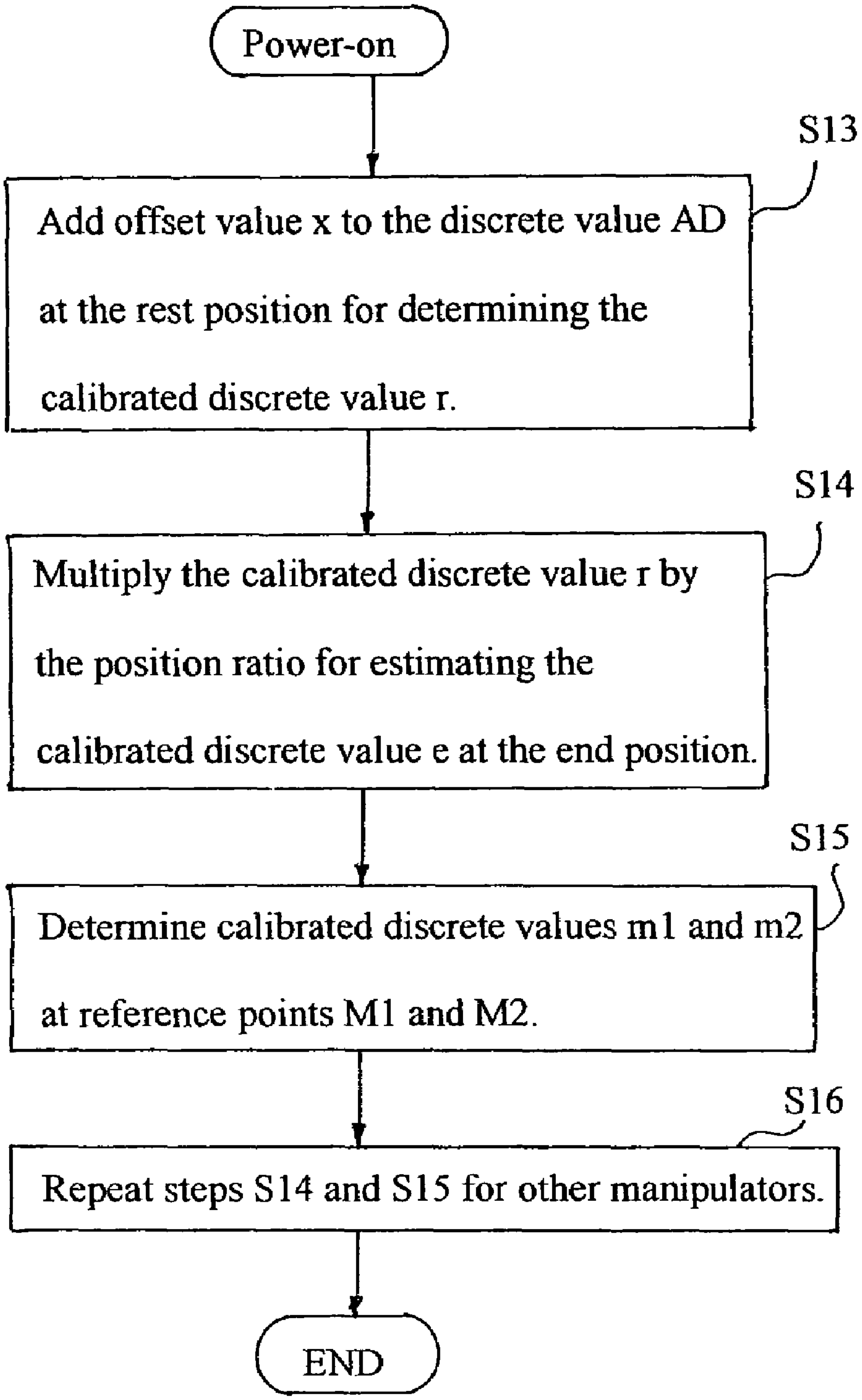
FIG. 6 is a flowchart showing a sequence of jobs executed in a system initialization.

FIG. 6 shows a sequence of jobs carried out by the central processing unit 20 in the calibration. First, the central processing unit 20 fetches the discrete value AD at the rest position from the interface 24 for the leftmost hammer 2, and memorizes the discrete value AD in the working memory 22. The central processing unit 20 reads out the offset value x from the read only memory 21, and adds the offset value x to the discrete value AD as by step S13. The sum or calibrated discrete value is corresponding to the value r in FIG. 3, and the calibrated discrete value r is memorized in the working memory 21.

Subsequently, the central processing unit 20 multiplies the calibrated discrete value r by the position ratio at the end positions, and determines the calibrated discrete value e at the end position as by step S14. In case where the discrete values AD are presumed to be on plots A, the position ratio is 50%, and the central processing unit 20 determines the calibrated discrete value e at the end positions by multiplying the calibrated discrete values r by 0.5. The calibrated discrete value e is also memorized in the working memory 22.

Subsequently, the central processing unit 20 determines the position ratio at the first reference point M1 and the position ratio at the second reference point M2, and multiplies the calibrated discrete value r by the position ratio at the first reference point M1 and the position ratio at the second reference point M2 as by step S15. The products are indicative of the calibrated discrete value m1 at the first reference point M1 and the calibrated discrete value m2 at the second reference point M2, and the calibrated discrete values m1 and m2 are memorized in the working memory 22.

The central processing unit 20 repeats the jobs at steps S13 to S15 for the other black and white keys 1*a*/1*b*, and the calibrated discrete values r, e, m1 and m2 are memorized in the working memory 22 as by step S116. When the calibrated discrete values r, e, m1 and m2 are memorized in the working memory 22 for all the black and white keys 1*a*/1*b*, the central processing unit 20 proceeds to the next initialization work. As will be hereinlater described in detail, the central processing unit 20 calculates the hammer velocity with reference to the calibrated discrete values m1 and m2, and acknowledges the impacts on the strings 4 by using the calibrated discrete values m1 and m2.

Thus, the central processing unit 20 directly calibrates the hammer sensors 26 only at the rest positions by adding the offset value x to the discrete values AD. This feature is desirable from the viewpoint of reduction in load on the central processing unit 20.

Analysis on Hammer Motion

Figure 7:
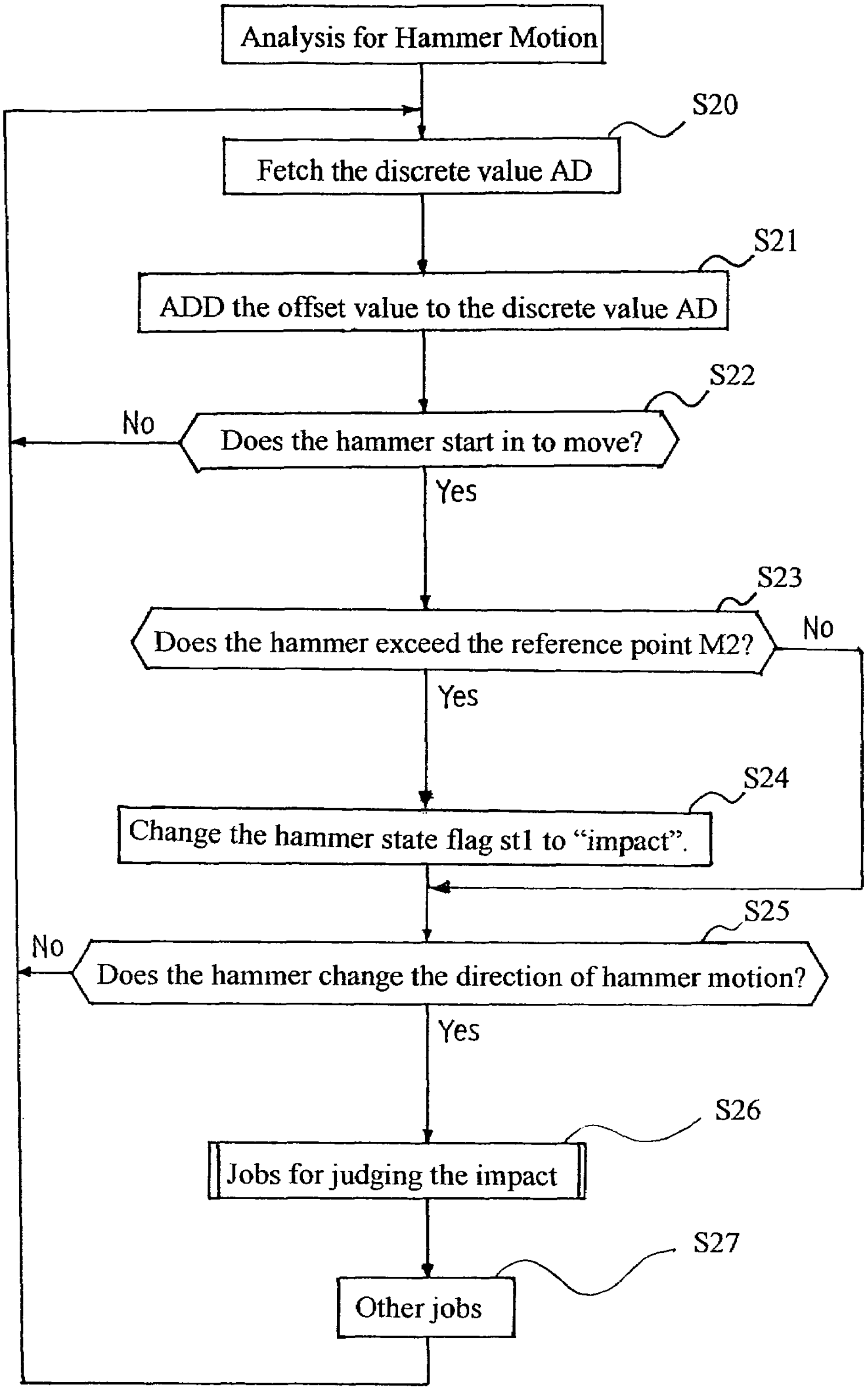
FIG. 7 is a flowchart showing a sequence of jobs executed for analysis on hammer motion.

FIG. 7 shows a sequence of jobs for the analysis of hammer motion. The central processing unit 20 periodically repeats the subroutine program for the analysis on the hammer motion in the recording. When a pianist instructs the recording system 500 to record his or her performance, the main routine program periodically branches to a subroutine program for the recording, and the subroutine program for the analysis on the hammer motion is carried out for each of the eighty-eight hammers 2 as a part of the subroutine program for the recording.

The central processing unit 20 firstly fetches the discrete value AD indicative of the current hammer position of the presently noticed hammer 2 from the interface 24 as by step S20. The central processing unit 20 reads out the offset value x from the read only memory 21, and adds the offset value x to the discrete value AD so as to determined the calibrated discrete value AD' as by step S21. The central processing unit 20 checks the internal clock for the time TIME at which the discrete value AD is fetched, and accumulates the calibrated discrete value AD' and time TIME in a table TBL1 shown in FIG. 8A. Eighty-eight tables are prepared in the working memory 22, and are respectively assigned to the eighty-eight hammers 2. The table TBL1 shown in FIG. 8A is assumed to the assigned to the presently noticed hammer 2. The table TBL1 contains twenty memory locations, and the twenty pairs of calibrated discrete values AD' and times TIME are stored in the twenty memory locations, respectively. The new pair of calibrated discrete value AD' and time TIME is accumulated in the first memory location 1, and the pairs of calibrated discrete values AD' and times TIME are moved to the next memory locations 2-19, respectively. The oldest pair is pushed out from the table TBL1. Thus, the newest twenty pairs of calibrated discrete values AD' and times TIME are accumulated in the table TBL1.

Subsequently, the central processing unit 20 checks the table TBL1 to see whether or not the hammer 2 has started to travel on the hammer trajectory as by step S22. In this instance, the central processing unit 20 compares the calibrated discrete values AD' with the calibrated discrete value r, and answers the question. If the central processing unit 20 finds the hammer 2 at the rest position, the answer is given negative "No", and the central processing unit 20 returns to steps S20. Thus, the central processing unit 20 reiterates the loop consisting of steps S20 to S22 so as to find the hammer or hammers 2 already left the rest position.

The pianist is assumed to depress the black or white key 1*a*/1*b* linked with the presently noticed hammer 2. The answer at step S22 is given affirmative "Yes". With the positive answer "Yes", the central processing unit proceeds to step S23, and compares the newest calibrated discrete value AD' with the calibrated discrete value m2 to see whether or not the hammer 2 has passed the second reference point M2 as by step S23. As described hereinbefore, the second reference points M2 is spaced from the end position by only 0.5 millimeter. While the answer at step S23 is given negative "No", the hammer 2 is still on the way to the second reference point M2, and the central processing unit 20 proceeds to step S25 without any execution at step S24. For this reason, the central processing unit 20 keeps a hammer state flag st1 in "non-impact state".

On the other hand, when the hammer 2 reaches of exceeds the second reference point M2, the answer at step S23 is given affirmative "Yes", and the hammer 2 is found immediately before the impact on the string 4. In other words, it is possible to presume that the hammer 2 will soon be brought into collision with the string 4. Thus, the second reference point M2 serves as a threshold of the presumption.

The second reference point M2 makes it possible to discriminate the hammer 2 immediately before the impact on the string 4. The calibrated discrete value AD' is indicative of a position on the hammer trajectory close to the actual hammer position so that the central processing unit 20 can exactly presume the current status of the hammer 2.

With the positive answer "Yes" at step S23, the central processing unit 20 proceeds to step S24, and changes the hammer state flag st1 from "non-impact state" to "impact state". While the hammer 2 is traveling on the hammer trajectory between the rest position and the second reference point M2, the hammer state flag st1 is indicative of the non-impact state.

Subsequently, the central processing unit 20 checks the table TBL1 to see whether or not the hammer 2 changes the direction of the hammer motion as by step S25. As described hereinbefore, a series of calibrated discrete values AD' is stored in the table TBL1. If the calibrated discrete values AD' are simply increased or decreased toward the latest calibrated discrete value AD', the central processing unit 20 decides that the hammer 2 is advancing toward the end position or leaving the end position, and the answer at step S25 is given negative "No". Then, the central processing unit 20 returns to step S20, and reiterates the loop consisting of steps S20 to S25 until the answer is changed to the affirmative.

If the series of calibrated discrete values AD' is peaked at a certain fetching time TIME, the central processing unit 20 decides that the hammer 2 has changed the direction of hammer motion, and the answer at step S25 is changed to the positive answer "Yes". The central processing unit 20 assumes that the hammer 2 rebounded on the string 4 at the certain fetching 4 time TIME, and prepares a table TBL2 shown in FIG. 8B. The table TBL2 has eleven memory locations, which are assigned to the five pairs of calibrate discrete values AD'(−5) to AD'(−1) and times t(−5) to t(−1), the pair of calibrated discrete value AD'(0) and time t(0) at the turning point and the five pairs of calibrated discrete values AD'(1) to AD'(5) and times t(1) to t(5). The hammer velocity V(−4) to V(5) and hammer acceleration a(−4) to a(4) are calculated, and are written in the eleven memory locations, respectively. The hammer motion is assumed to be uniform, and the central processing unit 20 divides the increment in stroke between each point and the previous point by the increment of time therebetween. The central processing unit 20 determines the acceleration through the differentiation on the calculated hammer velocity. There are various calculation methods for the velocity and acceleration. Any calculation method is available for the hammers 2.

The table TBL2 may be prepared at step S21 together with the table TBL1. The velocity and acceleration may be calculated at step S21. If the velocity is calculated at step S21, it is possible to determine the direction of hammer motion on the basis of the velocity in the table TBL2.

Upon completion of the jobs at step S25, the central processing unit 20 proceeds to step S26. The jobs at step S26 will be hereinafter described with reference to FIG. 9.

Upon completion of the jobs at step S26, the central processing unit 20 proceeds to step S27, and achieves other jobs carried out on the basis of the results of the analysis. One of the important jobs is to produce the note-on event codes and note-off event codes. Pieces of music data such as the depressed/released key number Kni and hammer velocity are memorized in the note-on event/note-off event as defined in the MIDI protocols.

When the music data codes are produced, the central processing unit 20 stores the music data codes in the working memory 22, and returns to step S20. Thus, the central processing unit 20 reiterates the loop consisting of steps S20 to S27 until the pianist instructs the recording system 500 to complete the recording.

Figure 9:
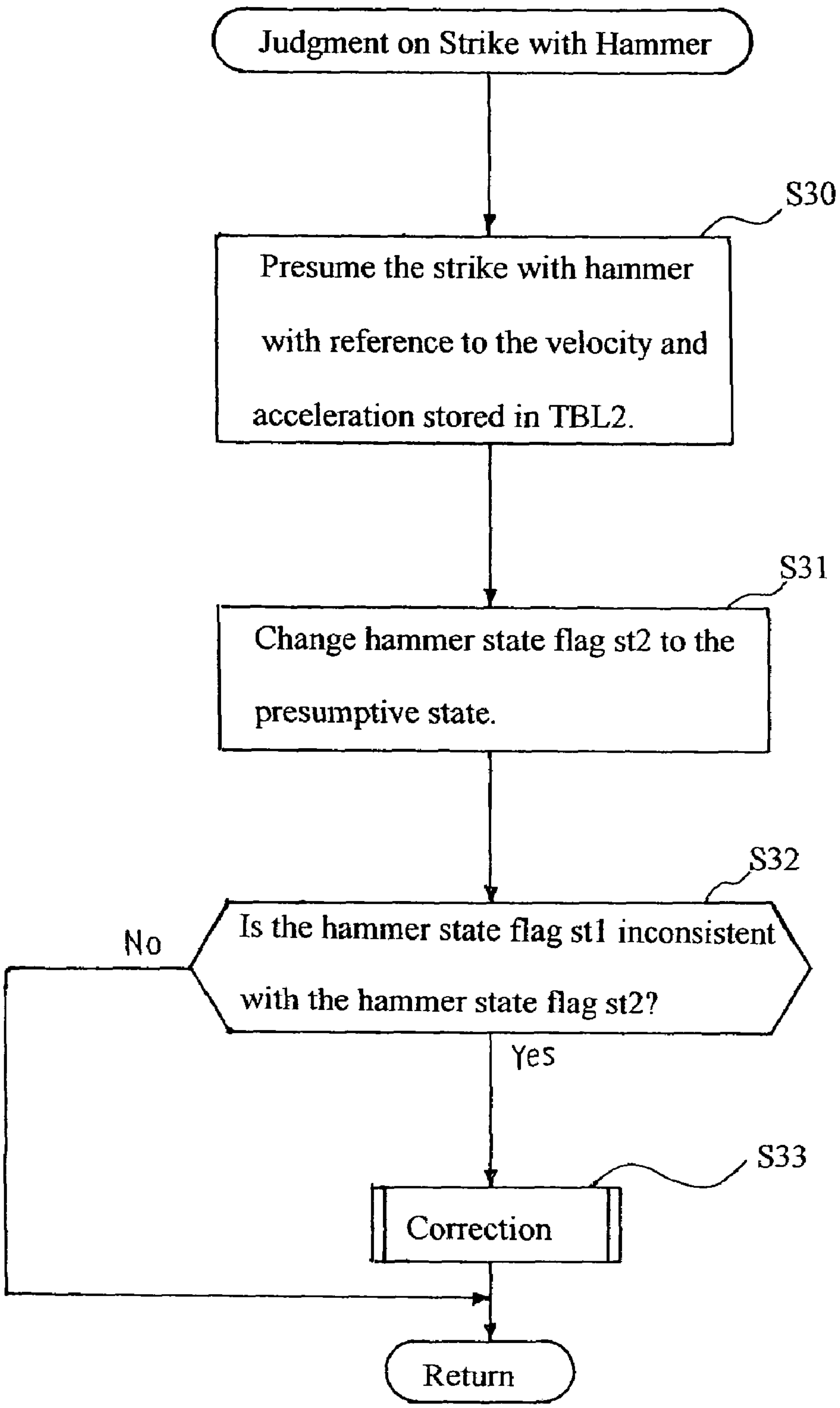
FIG. 9 is a flowchart showing a sequence of jobs for judging on a strike with the hammer.

Turning to FIG. 9, the central processing unit 20 firstly accesses the table TBL2, and checks the velocity and acceleration to see whether or not the hammer 2 changes the direction of motion as by step S30. In detail, the central processing unit 20 analyzes the velocity and acceleration from t(−5) to t(0), and determines the hammer behavior toward the string 4. Subsequently, the central processing unit 20 analyzes the velocity and acceleration from t(0) to t(5), and determines the hammer behavior after the rebound. The central processing unit 20 investigates the hammer behavior to see whether or not the hammer 2 fulfills one of the following conditions.

Condition 1:

In case where one of the values of velocity v(0), v(−1) and v(−2) is greater than a critical velocity, which is, by way of example, 0.3 m/s, the central processing unit 20 acknowledges that the hammer 2 is fast enough to strike the string 4, and presumes that the hammer 2 is surely brought into collision with the string 4.

Condition 2:

In case where the absolute value |a(0)| is the greatest in the group of the absolute values |a(−3)|, |a(−2)|, |a(−1)|, |a(0)|, |a(1)|, |a(2)| and |a(3)|, the central processing unit 20 presumes that the hammer 2 is possibly brought into collision with the string 4.

Condition 3:

In case where the central processing unit 20 finds another absolute value to be greater than the absolute value |a(0)|, i.e., the hammer 2 does not fulfill the condition 2, and/or in case where the velocity v(0), which is determined through the quadratic curve approximation, is nearly equal to zero, the central processing unit 20 presumes that there is a high possibility not to strike the string 4 with the hammer 2.

Upon completion of the presumption, the central processing unit 20 changes a hammer state flag st2 to the presumptive state depending upon the condition fulfilled by the hammer 2 as by step S31. Thus, the hammer state flag expresses the positive presumptive state corresponding to the condition 1 or condition 2 or negative presumptive state corresponding to the condition 3. Otherwise, the hammer state flag st2 may express the presumptive state that the hammer 2 is admitted to be surely brought into collision with the string 4, presumptive state that the hammer may be brought into collision with the string 4 or presumptive state that the hammer may not be brought into collision with the string 4.

Subsequently, the central processing unit 20 compares the hammer state flag st1 with the hammer state flag st2 to see whether or not the inconsistency takes place between the presumptions as by step S32. If the presumptive state st1 is consistent with the presumptive state st2, the answer at step S32 is given negative "No", and the central processing unit 20 returns to the loop consisting of steps S20 to S27. When the inconsistency is found, the answer at step S32 is given affirmative "Yes", and the central processing unit 20 proceeds to step S33, and carries out jobs shown in FIG. 10. Upon completion of the jobs shown in FIG. 10, the central processing unit 20 returns to the loop consisting of steps S20 to S27.

Figure 10:
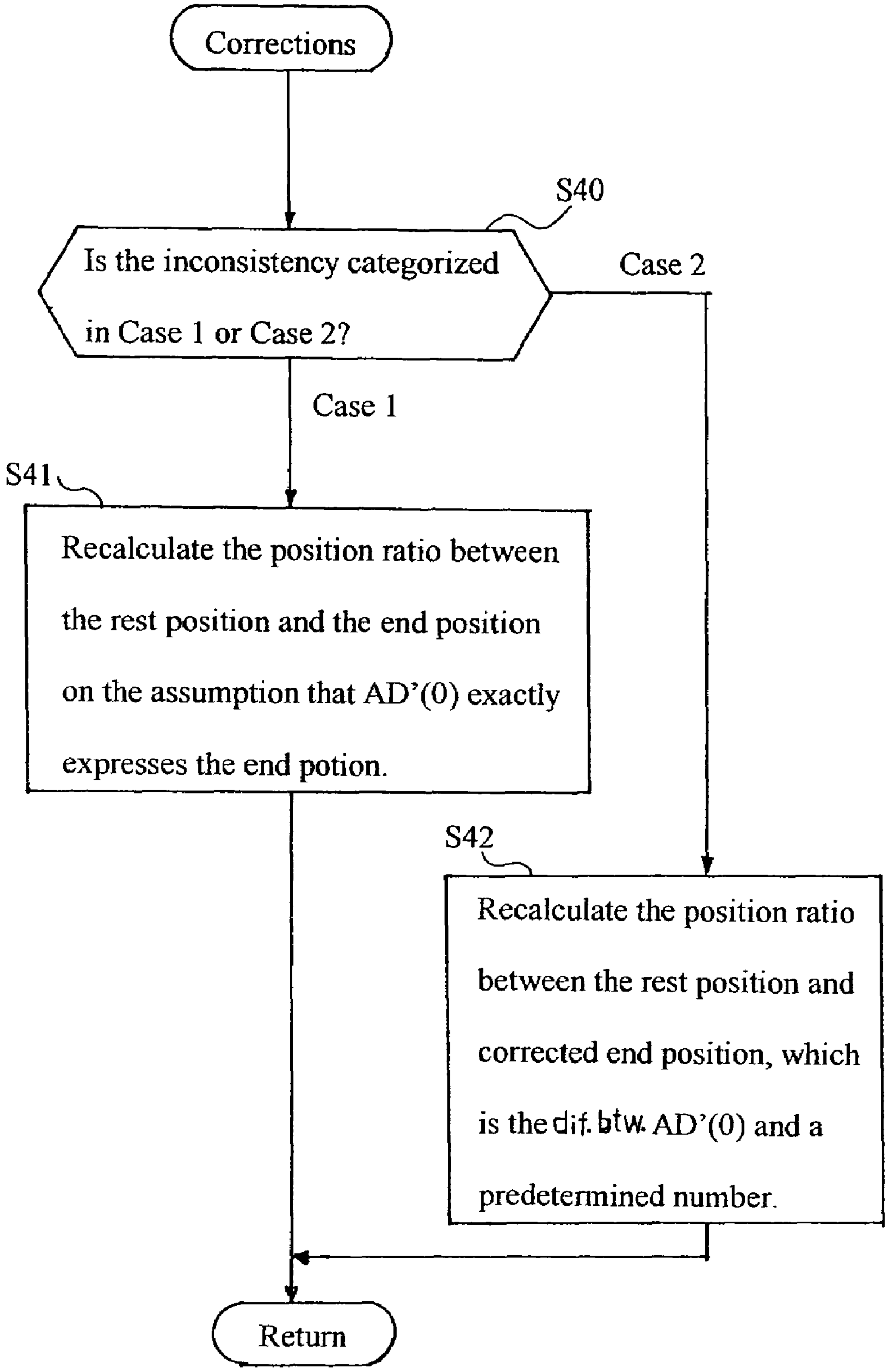
FIG. 10 is a flowchart showing a sequence of jobs for corrections.

Turning to FIG. 10 of the drawings, the central processing unit 20 examines the inconsistency to see which case the inconsistency is categorized in as by step S40.

Case 1: The hammer state flag st1 expresses the "non-impact state", and the other hammer state flag st2 expresses the positive presumptive state.

Case 2: The hammer state flag st1 expresses the "impact state", and the other hammer state flag st2 expresses the negative presumptive state.

When the central processing unit 20 categorizes the inconsistency in the case 1, the central processing unit 20 proceeds to step S41, and recalculates the position ratio between the rest position and the end position as by step S41. In detail, the positive presumptive state, which is memorized in the hammer state flag st2, is more reliable than the presumption memorized in the other hammer state flag st1, because the presumptive state is based on the actual hammer motion. The central processing unit 20 presumes that the calibrated discrete value e at the end position E is smaller than a true value at the end position. The small calibrated discrete value e makes the reference point M2 closer to the rest position R. Since the calibrated discrete value r at the rest position is determined on the basis of the discrete value AD fetched from the output node of the analog-to-digital converter 24*b*, the calibrated discrete value r correctly indicates the rest position R, and the position ratio between the rest position R and the end position E is to be doubtful. For this reason, the central processing unit 20 recalculates the ratio between the rest position R and the end position. The calibrated discrete value AD'(0) correctly indicates the end position E. The central processing unit 20 determines the ratio between the calibrated discrete value AD'(0) and the calibrated discrete value r at the rest position, and memorizes the correct position ratio in the electrically erasable and programmable memory 21. The calibrated discrete values m1 and m2 at the reference points M1 and M2 are also recalculated on the basis of the calibrated discrete value r and the new calibrated discrete value e.

When the central processing unit 20 categorizes the inconsistency in Case 2, the central processing unit 20 recalculates the position ratio as by step S42. In detail, the negative presumptive state is also more reliable than the presumption memorized in the hammer state flag st1. The reason why the central processing unit 20 presumes the impact state is that the calibrated discrete value e at the end position E is larger than the true value at the end position E, and recalculates the position ratio between the rest position R and the end position E. The true value at the end position E is possibly less than the calibrated discrete value AD'(0) so that the central processing unit 20 subtracts a predetermined number from the calibrated discrete value AD'(0). The central processing unit assumes the sum AD'(0−x) indicates the end position E, and determines the ratio between the calibrated discrete value r and the difference AD'(0−x). The ratio between the calibrated discrete value r and the difference AD'(0−x) is memorized in the electrically erasable and programmable memory 21 as the position ratio between the rest position R and the end position E. Thereafter, the central processing unit 20 recalculates the calibrated discrete values m1/m2 at the reference points M1/M2. If the predetermined value x is too large, the inconsistency takes place, again, and the inconsistency is categorized in Case 1 in the next execution.

Upon completion of the job at step S41 or S42, the central processing unit 20 returns to the job sequence shown in FIG. 9.

As will be understood from the foregoing description, the central processing unit 20 twice presumes the strike on the string 4 through the different procedures, and compares the results of the presumptions with one another to see whether or not the calibrated discrete value e correctly indicates the end position E. Even if the light-emitting element of the hammer sensors 26 varies the incident light-to-photo-current converting characteristics due to the aged deterioration, i.e., the central processing unit 20 calibrates the hammer sensor 26 in the jobs at steps S21 and S33 so that the hammer sensors 26 exactly report the hammer positions to the central processing unit 20. Since the music data codes are produced on the basis of the hammer motion expressed by the calibrated discrete values, the music data codes exactly express the performance, and the automatic player 300 can reenact the performance at high fidelity. If the action units 3 vary their dimensions due to the aged deterioration, the relative position between the action units 3 and the black and white keys 1*a*/1*b* is also varied, and the end positions E are moved on the trajectories. Even so, the hammer sensors 26 are calibrated through the jobs at step S33. For this reason, the recorder 500 can exactly express the performance on the keyboard 1 by using a set of music data codes.

Second Embodiment

Figure 11:
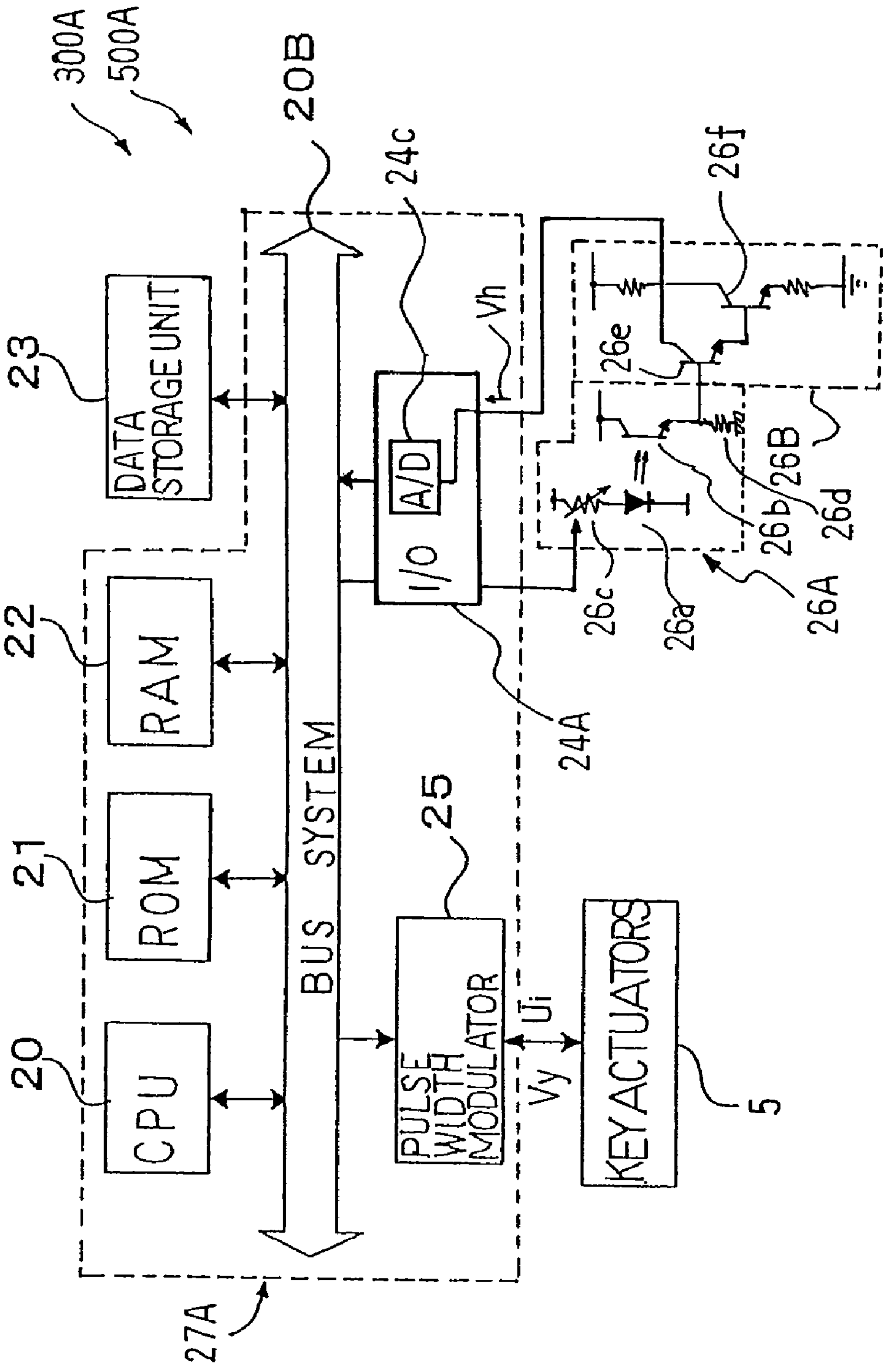
FIG. 11 is a circuit diagram showing a data processing unit, photo-couplers and amplifiers incorporated in another automatic player piano according to the present invention.

Turning to FIG. 11 of the drawings, a data processing unit 27A, solenoid-operated key actuators 5 and hammer sensors 26A are incorporated in an electronic system, which forms a part of another automatic player piano embodying the present invention. The automatic player piano implementing the second embodiment further comprises an acoustic piano, which is similar in constitution to the acoustic piano 100. For this reason, the component parts of the acoustic piano are labeled with references designating the corresponding component parts of the acoustic piano 100 without any detailed description for the sake of simplicity.

The electronic system also serves as an automatic player 300A and a recorder 500A. The solenoid-operated key actuators 5 are same as those incorporated in the first embodiment, and the data processing unit 27A is similar to the data processing unit 27 except an interface 24A. However, the hammer sensors 26A are different from the hammer sensors 26. For this reason, description is hereinafter focused on the interface 24A and hammer sensors 26A.

Any operational amplifier is not incorporated in the interface 24A. Although the interface 24A includes signal buffers, sampling-and-hold circuits and analog-to-digital converters 24*c*, only the analog-to-digital converters 24*c* are shown in FIG. 11. The circuit behaviors of those circuits are well known to persons skilled in the art, and detailed description is omitted.

The hammer sensors 26A are respectively provided for the eighty-eight hammers 2, and each hammer sensor 26A includes a photo coupler 26*a*/26*b*, a variable resistor 26*c* and an amplifier 26B. The variable register 26*c* is implemented by a combination circuit of a resistor array and a selector, and the selector is responsive to a control signal, which is supplied from the central processing unit 20, so as to selectively connect taps in the resistor array to the light emitting diode 26*a*. The emitted light is propagated through an optical fiber (not shown) to a light radiating sensor head (not shown), and the radiated light extends across the trajectory of the associated hammer 2. The radiated light is incident onto a light receiving sensor head (not shown), and the incident light is propagated through an optical fiber (not shown) to the light detecting transistor 26*b*. The light detecting transistor 26*b* converts the incident light to photo current, and the photo current is converted to an output voltage by means of a resistor 26*d*. The output voltage is applied to the amplifier 26B.

In this instance, the amplifier 26B is implemented by a Darlington pair, and the output signal or an analog hammer position signal is supplied from the Darlington pair to the signal buffer (not shown) of the interface 24A. The signal buffer (not shown) relays the analog hammer position signal to the sample-and-hold circuit (not shown), and discrete values on the analog hammer position signal are converted to the digital hammer position signal by means of the analog-to-digital converter 24*c* as similar to that in the first embodiment. Since the bipolar transistors 26*e* and 26*f* are inserted in the ground and the output node of the amplifier 26B, the offset voltage is unavoidable due to the baseemitter voltage. Thus, the offset voltage is unavoidably introduced in the analog hammer position signal as well as that in the first embodiment.

The subroutine programs shown in FIGS. 5, 6, 7, 9 and 10 run on the central processing unit 20 so as to calibrate the position-to-voltage characteristics of the hammer sensors 26A. Thus, the advantages of the first embodiment are also achieved by the second embodiment.

As will be appreciated from the foregoing description, an offset value x is determined and memorized in the data processing unit 27/27A, and the data processing unit 27/27A incorporated in a musical instrument calibrates the position-to-voltage characteristics by using the offset value x. For this reason, even if the aged deterioration influences the light-to-photocurrent converting characteristics and/or the relative position among the mechanical components of the acoustic musical instrument 100, the data processing unit 27/27A makes the present position-to-voltage characteristics consistent with the original position-to-voltage characteristics, and exactly carries out the data processing on the basis of the calibrated data.

Although particular embodiments of the present invention have been shown and described, it will be apparent to those skilled in the art that various changes and modifications may be made without departing from the spirit and scope of the present invention.

The MIDI protocols do not set any limit to the technical scope of the present invention. Any protocols are available for the music data in so far as the data codes can express the pieces of music data.

The optical position transducer does not set any limit to the technical scope of the present invention. Any sort of hammer sensor, which may be one of the hammer sensors disclosed in Japanese Patent Application laid-open No. 2001-175262. In case where the hammer sensors report the hammer velocity or acceleration, the data processing unit 20 calculates the other physical quantity through an integration and a differentiation.

The constitution of hammer sensor 26 does not set any limit to the technical scope of the present invention. Plural pairs of photo-couplers may be provided for the eighty-eight hammers 2, respectively, and the light beams are directly created between the light emitting elements and the light detecting elements across the trajectories of the hammers.

The solenoid-operated key actuators do not set any limit to the technical scope of the present invention. A pneumatic actuator or an electric motor may serve as the key actuators.

The target key motion and current key motion may be expressed by another combination of physical quantities such as, for example, the position and acceleration or the position, velocity and acceleration. Thus, the key position and key velocity do not set any limit to the technical scope of the present invention.

In the above-described embodiments, the position ratio is corrected at step S41 or S42. The calibrated discrete values e and r may be corrected, or the discrete values AD may be corrected through an arithmetic operation.

The velocity and acceleration in the presumption at step S30 do not set any limit to the technical scope of the present invention. Only the velocity may be analyzed for the presumption. In case where vibration sensors monitor the strings 4, the central processing unit 20 presumes the strike on the string 4 on the basis of the output signal of the vibration sensors. The vibration sensor may be replaced with a microphone and a frequency analyzer.

The calibrated discrete values AD' may be used in the servo control on the black and white keys 1*a*/1*b*. In this instance, the data processing unit presumes current key positions on the basis of the calibrated discrete values, and supplies the key position data to the servo controller 12. In this instance, the built-in plunger sensors 5*c* are not necessary for the servo control, and the production cost is reduced. Thus, the recording, in which the calibrated discrete values AD' are used, does not set any limit to the technical scope of the present invention.

In the above-described embodiments, the present position-to-voltage characteristics are determined on the basis of the calibrated discrete values AD' at the rest position R. However, the rest position R does not set any limit on the technical scope of the present invention. The present position-to-voltage characteristics may be determined on the basis of the calibrated discrete values AD' at predetermined points on the trajectories except the rest and end positions R and E.

The discrete values r1, r2, e1 and e2 do not set any limit on the technical scope of the present invention. The offset value may be determined by using discrete values at more than 2 points on each of plots B/C. In case where more than 4 offset values are used in the presumption of the offset value x, plots B and C may be assumed to be non-linear.

The presumption of offset value x and/or calibration may be accomplished by using logic circuits instead of the software.

The present invention may be applied to key sensors, pedal sensors, damper sensors and/or shank sensors. In case where the electronic system is installed in another sort or musical instruments such as, for example, a percussion instrument, a wind instrument and a stringed instrument, the present invention is applied to the sensors monitoring the manipulators incorporated in the musical instruments.

Claim languages are correlated with the component parts of the embodiments as follows. Each of the hammers 2 serves as a "moving object", and the voltage converter VR and variable resistor 26*c* serve as a "gain controller". The hammer position is "physical quantity", and plots B and plots C stands for discrete values in a "first range" and discrete values in a "second range", respectively. The hammer sensors 26/26A, interface 24/24A, which contains the analog-to-digital converter 24*b*/24*c* and operational amplifier 24*a* or amplifier 26B, bus system 20B, central processing unit 20 and computer program shown in FIGS. 5, 6, 7, 9 and 10, which run on the central processing unit 20 as a whole constitute a "transducer". The hammer sensor 26/26A, which contains the photo coupler 26*a*/26*b*, serves as a "converter", and the analog-to-digital converter 24*b*/24*c* and operational amplifier 24*a* or amplifier 26B as a whole constitute an "electric circuit". The hammer position signal Vh and a series of codes representative of the discrete values AD are respectively corresponding to an "analog signal" and a "digital signal", respectively. The central processing unit 20 and computer programs shown in FIGS. 5, 6, 7, 9 and 10 as a whole constitute a "calibrator".

The central processing unit 20 and jobs at steps S4, S5, S6, S7, S8 and S9 as a whole constitute a "data collector", the central processing unit 20 and jobs at steps S5 and S8 as a whole constitute a "shifter", and the central processing unit 20 and jobs at step S10 as a whole constitute an "information processor".

The central processing unit 20 and jobs at steps S13 serve as a "calculator", and the central processing unit 20 and jobs at steps S14 and S115 serve as an "estimator". The end position E is expressed by a "position ratio" of 2:1 with respect to the rest position. The hammer state st1 and st2 are corresponding to "first present state" and "second present state". The central processing unit 20 and jobs at steps S20-S25, S30-S32 and S40-S42 as a whole constitute the "calibrator" for recalculating the calibrated discrete values at the end position and reference points.

The black and white keys 1*a*/1*b*, action units 3 and hammers 2 form in combination "plural link works", and the hammers 2 are corresponding to "certain links".

Each of the hammers 2 serves as an "object", and plots B and plots C stand for discrete values in a "first potential range" and discrete values in a "second potential range", respectively.

What is claimed is:

1. A transducer for converting a physical quantity of a moving object to a digital signal representative of said physical quantity, comprising:

a gain controller varying a potential range of an analog signal representative of said physical quantity expressing motion of said moving object;

a converter monitoring said moving object, and causing said analog signal to swing a potential level in said potential range depending upon said physical quantity;

an electric circuit connected to said converter, introducing an offset voltage into said analog signal, and producing said digital signal on the basis of said analog signal; and a calibrator connected to said gain controller and said electric circuit, causing said gain controller to change said potential range between a first range and a second range so as to determine an offset value corresponding to said offset voltage on the basis of said digital signal produced in said first range and said digital signal produced in said second range, and adding said offset value to said digital signal so as to output a calibrated digital signal.

2. The transducer as set forth in claim 1, in which said calibrator includes a data collector connected to said electric circuit and a driver, causing said driver to repeatedly move said moving object and fetching discrete values from said digital signal at predetermined points on a locus of said moving object in each travel of said moving object on said locus so as to memorize said discrete values therein, a shifter connected to said gain controller and responsive to an instruction so as to make said gain controller change said potential range from said first range to said second range when said moving object reaches an end point of said locus, and an information processor connected to said data collector and determining said offset value through arithmetic operations on said discrete values memorized under said first range and said discrete values memorized under said second range.

3. The transducer as set forth in claim 2, in which said predetermined points are a rest position of said moving object and an end position of said moving object.

4. The transducer as set forth in claim 3, in which said information processor determines said offset value by using the following equation $$x=(r2\times e1-r1\times e2)/(r1-r2+e2-e1)$$

where x is said offset value, e1 and r1 are said discrete values memorized under said first range and e2 and r2 are said discrete values memorized under said second range.

5. The transducer as set forth in claim 1, in which said calibrator includes a calculator adding said offset value to a discrete value on said digital signal at a predetermined point on a locus of said moving object so as to determine a calibrated discrete value at said predetermined point, an estimator estimating calibrated discrete values on said locus of said moving object at other predetermined points on said locus on the basis of said calibrated discrete value at said predetermined point.

6. The transducer as set forth in claim 5, in which said predetermined point is a rest position of said moving object, and said other predetermined points are an end position of said moving object and reference points between said rest position and said end position.

7. The transducer as set forth in claim 6, in which said end position is expressed by a position ratio with respect to said rest position so that said estimator estimates said calibrated discrete value at said end position by multiplying said calibrated discrete value at said rest position by said position ratio, and said reference points are expressed by other position ratios so that said estimator estimates said calibrated discrete values at said reference points by using the multiplication.

8. The transducer as set forth in claim 6, in which said calibrator compares calibrated discrete values on said locus with the calibrated discrete value at one of said reference points so as to presume first present state representative of an arrival at a vicinity of said end position, analyzes at least one physical quantity expressing the motion of said moving object in another vicinity of said end position so as to presume second present state, compares said first present state with said second present state to see whether or not said first present state is inconsistent with said second present state, and recalculates said calibrated discrete value at said end position and said calibrated discrete values at said reference points when the inconsistency is found between said first present state and said second present state.

9. A musical instrument comprising:

plural link works including certain links, respectively, and selectively moved for specifying the pitch of tones to be produced;

a gain controller varying a potential range of analog signals representative of a physical quantity expressing motion of said certain links;

plural converters respectively monitoring said certain links, and causing said analog signals to swing a potential level in said potential range depending upon said physical quantity;

electric circuits respectively connected to said plural converters, introducing offset voltages into said analog signals, respectively, and respectively producing digital signals representative of said physical quantity on the basis of said analog signals; and a calibrator connected to said gain controller and said electric circuits, causing said gain controller to change said potential range between a first range and a second range so as to determine offset values corresponding to said offset voltages on the basis of said digital signals produced in said first range and said digital signals produced in said second range, and adding said offset values to said digital signals so as to output a calibrated digital signal.

10. The musical instrument as set forth in claim 9, in which said calibrator includes a data collector connected to said electric circuits and a driver, causing said driver to repeatedly move said certain links and fetching discrete values from each of said digital signals at predetermined points on a locus of associated one of said certain links in each travel of said associated one of said certain links on said locus so as to memorize said discrete values therein, a shifter connected to said gain controller and responsive to an instruction so as to make said gain controller change said potential range from said first range to said second range when said certain links reach respective end points of said loci, and an information processor connected to said data collector and determining each of said offset values through arithmetic operations on said discrete values memorized under said first range and said discrete values memorized under said second range.

11. The musical instrument as set forth in claim 10, in which said predetermined points on each locus are a rest position of associated one of said certain links and an end position of said associated one of said certain links.

12. The musical instrument as set forth in claim 11, in which said information processor determines said each of said offset values by using the following equation $$x=(r2\times e1-r1\times e2)/(r1-r2+e2-e1)$$

where x is said one of said offset values, e1 and r1 are said discrete values memorized under said first range and e2 and r2 are said discrete values memorized under said second range.

13. The musical instrument as set forth in claim 9, in which said calibrator includes a calculator adding said each of said offset values to a discrete value on said digital signal at a predetermined point on the locus of one of said certain links so as to determine a calibrated discrete value at said predetermined point, an estimator estimating calibrated discrete values on said locus of said one of said certain links at other predetermined points on said locus on the basis of said calibrated discrete value at said predetermined point.

14. The musical instrument as set forth in claim 13, in which said predetermined point is a rest position of said one of said certain links, and said other predetermined points are an end position of said one of said certain links and reference points between said rest position and said end position.

15. The musical instrument as set forth in claim 14, in which said end position is expressed by a position ratio with respect to said rest position so that said estimator estimates said calibrated discrete value at said end position by multiplying said calibrated discrete value at said rest position by said position ratio, and said reference points are expressed by other position ratios so that said estimator estimates said calibrated discrete values at said reference points by using the multiplication.

16. The musical instrument as set forth in claim 14, in which said calibrator compares calibrated discrete values on said locus with the calibrated discrete value at one of said reference points so as to presume first present state representative of an arrival at a vicinity of said end position, analyzes at least one physical quantity expressing the motion of said one of said certain links in another vicinity of said end position so as to presume second present state, compares said first present state with said second present state to see whether or not said first present state is inconsistent with said second present state, and recalculates said calibrated discrete value at said end position and said calibrated discrete values at said reference points when the inconsistency is found between said first present state and said second present state.

17. The musical instrument as set forth in claim 9, in which keys, action units, hammers of an acoustic piano form in combination said plural link works, and said hammers are corresponding to said certain links.

18. The musical instrument as set forth in claim 17, further comprising a music code producer analyzing said calibrated digital signals so as to determine motion of said hammers, and produces pieces of music data representative of a performance on said acoustic piano on the basis of said motion of said hammers.

19. A method for determining an offset value corresponding to an offset voltage introduced in an analog signal, comprising the steps of:

a) setting a first potential range in a physical quantity-to-signal converter;

b) moving an object on a trajectory so that said physical quantity-to-signal converter produces said analog signal varied in said first potential range depending upon a physical quantity expressing the motion of said object;

c) converting said analog signal varied in said first potential range to a digital signal;

d) fetching discrete values at predetermined points on said trajectory of said object;

e) setting a second potential range in said physical quantity-to-signal converter;

f) moving said object on said trajectory so that said physical quantity-to-signal converter produces said analog signal varied in said second potential range depending upon said physical quantity;

g) fetching other discrete values at said predetermined points; and h) calculating said offset value on the basis of said discrete values and said other discrete values.

20. The method as set forth in claim 19, in which said offset value is used in another method for calibrating a transducer producing a digital signal representative of a physical quantity of a moving object on the basis of an analog signal influenced by an offset voltage and aged deterioration.

21. The method as set forth in claim 20, in which said another method includes the steps of:

fetching a discrete value on said digital signal at a predetermined point on a locus of said moving object, adding said offset value to said discrete value so as to determine a calibrated discrete value, estimating calibrated discrete values at predetermined points on said locus, and determining calibrated physical quantity-to-voltage characteristics of said transducer.

* * * * *